US006946169B1

(12) United States Patent
Tanioka et al.

(10) Patent No.: US 6,946,169 B1
(45) **Date of Patent: *Sep. 20, 2005**

(54) POLYAMIC ACID COMPOSITION, LIQUID CRYSTAL ALIGNING FILM, AND LIQUID CRYSTAL DISPLAY ELEMENT

(75) Inventors: Satoshi Tanioka, Ichihara (JP); Shizuo Murata, Ichihara (JP); Itsuo Shimizu, Ichihara (JP); Kazumi Ito, Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/581,624

(22) PCT Filed: Dec. 8, 1998

(86) PCT No.: PCT/JP98/05546

§ 371 (c)(1), (2), (4) Date: Jun. 15, 2000

(87) PCT Pub. No.: WO99/33923

PCT Pub. Date: Jul. 8, 1999

(30) Foreign Application Priority Data

Dec. 29, 1997 (JP) ............................................ 9-368092

(51) Int. Cl.$^7$ ............................................ C09K 19/00
(52) U.S. Cl. ......................... 428/1.25; 428/1.1; 428/1.2
(58) Field of Search ......................... 428/1.1, 1.2, 1.26, 428/1.33, 1.55, 1.25; 252/299.01; 528/170, 125, 86, 211

(56) References Cited

U.S. PATENT DOCUMENTS

| | | | | |
|---|---|---|---|---|
| 4,925,278 A | * | 5/1990 | Buchecker et al. | 252/299.63 |
| 5,414,126 A | | 5/1995 | Nakayama et al. | |
| 5,817,743 A | * | 10/1998 | Gibbons et al. | 428/1 |
| 6,084,058 A | * | 7/2000 | Murata et al. | 428/1 |
| 6,316,574 B1 | * | 11/2001 | Tanioka et al. | 428/1.1 |

FOREIGN PATENT DOCUMENTS

| | | | | |
|---|---|---|---|---|
| EP | 0 601 813 | | 6/1994 | |
| EP | 0 683 418 | | 11/1995 | |
| GB | 2 328 947 | * | 3/1999 | C08G/73/10 |
| JP | 2-223917 | | 9/1990 | |
| JP | 4-057027 | | 2/1992 | |
| JP | 7-120768 | | 5/1995 | |
| WO | 97 24640 | | 7/1997 | |
| WO | 98 31725 | | 7/1998 | |

* cited by examiner

*Primary Examiner*—Mark F. Huff
*Assistant Examiner*—Jennifer R Sadula
(74) *Attorney, Agent, or Firm*—McDermott Will & Emery LLP

(57) ABSTRACT

The present invention provides a liquid crystal display element having an adequate pre-tilt angle for preventing the reverse domain, as well as excellent electrical properties by preparation of the polyamic acid composition for the liquid crystal display element comprises a polyamic acid A that excels in electrical properties and a polyamic acid B that has side chains, mixed in the ratio A/B of 50/50 to 95/5 (by weight).

17 Claims, 1 Drawing Sheet

POLYAMIC ACID COMPOSITION, LIQUID CRYSTAL ALIGNING FILM, AND LIQUID CRYSTAL DISPLAY ELEMENT

TECHNICAL FIELD

The present invention relates to a polyamic acid composition which excels in electrical properties and reliability for use in the field of electronic materials. The applications thereof include alignment materials, protection films, insulation films, and the like. In particular, the polyamic acid composition is highly suitable for application to aligning films for liquid crystal display elements.

BACKGROUND ART

The present mainstream of liquid crystal display elements are those utilizing nemetic liquid crystals. Liquid crystal display elements presently in practical use include a TN element twisted by 90°, an STN element usually twisted by 180° or more, and a TFT liquid crystal display element utilizing thin film transistors. In addition to these, there have been developed liquid crystal display elements of various driving systems, such as a lateral-electric-field-type liquid crystal display elements of the IPS (In Plane Switching) mode having improved view-angle properties. The progress of liquid crystal display elements is not limited to only these modes, but active efforts to improve peripheral materials have been made in order to attain improvement of the properties of liquid crystal display elements.

With wider use of liquid crystal display elements in various fields, liquid crystal display elements having improved properties have been demanded. Such demands include demands in relation to the alignment properties of liquid crystals represented by the pre-tilt angle, demands in relation to the electrical properties of liquid crystal display elements such as current consumption, voltage holding ratio, and residual voltage, and demands for the reliability of such properties in long-time use.

Of these properties, the required pre-tilt angles of liquid crystals differ depending on the driving systems of liquid crystal display elements. For example, TN elements or TFT elements, in which liquid crystals are twisted by 90°, require a pre-tilt angle of 1 to 6°, and STN elements having larger twist angles require a pre-tilt angle of 3 to 8°. In addition to pre-tilt angles, properties related to the alignment of liquid crystals such as alignment uniformity, alignment stability, and anchoring energy at the liquid crystal aligning film interface are also important, because these properties influence the performance of liquid crystal display elements. In addition, the process margin of these properties in the manufacture of liquid crystal display elements is also important. A significant problem will arise if the pre-tilt angle or alignment of liquid crystals varies depending on the conditions of drying solvent after the application of alignment materials, conditions of imidizing the polyamic acid (typically by heat-treatment), or conditions of annealing after injecting liquid crystals.

For STN liquid crystal display elements, especially those of a low-voltage type used in portable devices, low current consumption is demanded because of the low driving voltage of liquid crystal display elements. That is, since voltage applied to liquid crystals lowers accordingly when the current consumption of a liquid crystal element rises, the rise of liquid crystal molecules becomes insufficient, and contrast lowers. For liquid crystal display elements of a low-voltage type, change in current consumption experienced in long-time use (reliability) is also important. Since STN display elements use a slight potential difference for turning a display on or off, if the current consumption of an element changes, voltage applied to liquid crystals also changes making normal driving impossible. In an extreme case, there results a phenomenon such that no images of a liquid crystal display element are displayed when the element is driven for a long time.

For TFT liquid crystal display elements, on the other hand, requirements for voltage holding ratio and residual voltage are particularly important. If voltage holding ratio is small, voltage applied to liquid crystals during the field period lowers, resulting in low contrast. If residual voltage is high, electric charge remains even if the voltage is turned off after the voltage is impressed, and images that should be erased remain as residual images. In TFT liquid crystal display elements, the residual image phenomenon is one of the most critical problems.

The object of the present invention is to provide a liquid crystal aligning film for obtaining a liquid display element having an optimal pre-tilt angle, low current consumption, and highly reliable pre-tilt angle and current consumption even after long-term use.

With regard to an example of a liquid crystal alignment material having stable liquid crystal alignment properties and pre-tilt angles and good electro-optical, properties, Japanese Patent Application Laid Open No. 07-120768 discloses an alignment material which contains a polyamic acid having an aliphatic tetracarboxylic dianhydride as an essential component, and a polyamic acid having an aromatic tetracarboxylic dianhydride as an essential component.

However, since no amine components having groups that increase the pre-tilt angle of liquid crystals are used in the cited reference, obtaining an adequate pre-tilt angle is difficult. Furthermore, electrical properties are poor because of the use of an amine component having ether groups. That is, it is difficult to obtain a material concurrently having an adequate pre-tilt angle, excellent electrical properties, and the reliability of these properties through the use of the process disclosed in the cited reference. Although the cited reference describes that a siloxane-based diamine is preferred, it has a problem of liquid crystal alignment because of a small pre-tilt angle (see Comparative Examples described herein).

DISCLOSURE OF INVENTION

In order to solve the above problems, the inventors of the present invention conducted repeated examinations on the structures of tetracarboxylic dianhydrides and diamines used in the polyamic acids and the combination of polyamic acids, and found that the above object was achieved by use, as the polymer component of a liquid crystal aligning film used in a liquid crystal display element, of an alignment material containing a polyamic acid A and a polyamic acid B, each having a specific tetracarboxylic dianhydride and a specific amine component selected from those described below aligning film.

According to a first aspect of the present invention, there is provided a polyamic acid composition comprising a polyamic acid A providing a polyimide having excellent electrical properties, and a polyamic acid B containing a diamine having side chains, wherein the polyamic acid A is a polyamic acid comprising an acid component containing aliphatic tetracarboxylic dianhydride, or acid component containing an aliphatic tetracarboxylic dianhydride and alicyclic tetracarboxylic dianhydride, and an amine component based on at least one of aromatic diamines represented by the following formula (1);

(1)

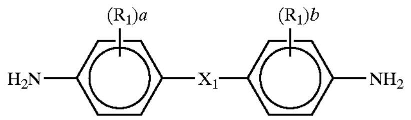

wherein, $X_1$ is a divalent aliphatic group; each $R_1$ is independently hydrogen atom or $CH_3$; and a and b are 1 to 2, and said polyamic acid B is a polyamic acid comprising an acid component containing 50 mole % or more aromatic tetracarboxylic dianhydride, and an amine component containing a diamine having a group enabling the pre-tilt angle of a liquid crystal to be increased on the side chain thereof, the ratio A/B of the polyamic acid A to the polyamic acid B being 50/50 to 95/5 (by weight).

According to a second aspect of the present invention, there is provided a polyamic acid composition according to the first aspect, wherein the diamine having a group enabling the pre-tilt angle of a liquid crystal to be increased in the polyamic acid B is at least one of diamines represented by general formulas (2) and (3), or said diamine and at least one of diamines represented by the above formula (1) and a general formula (4).

(2)

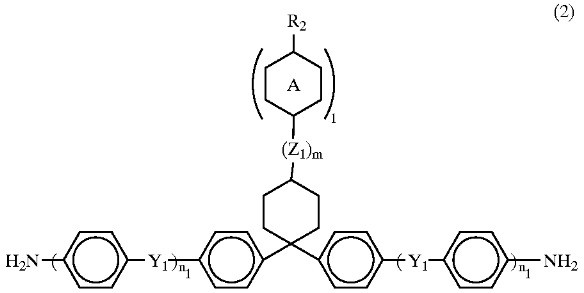

wherein, $R_2$ is hydrogen atom or an alkyl group having 1 to 12 carbon atoms; $Z_1$ is $CH_2$ group; m is an integer from 0 to 2; the ring A is benzene ring or cyclohexane ring; l is 0 or 1; each $Y_1$ is independently oxygen atom or $CH_2$ group; and each $n_1$ is independently 0 or 1.

(3)

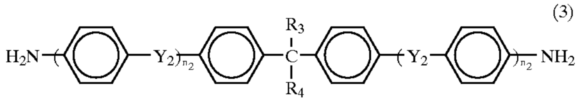

wherein, each $Y_2$ is independently oxygen atom or $CH_2$ group; each of $R_3$ and $R_4$ is independently hydrogen atom, an alkyl group or a perfluoroalkyl group having 1 to 12 carbon atoms, at least one of $R_3$ and $R_4$ being an alkyl group having 3 or more carbon atoms; and each $n_2$ is independently 0 or 1.

(4)

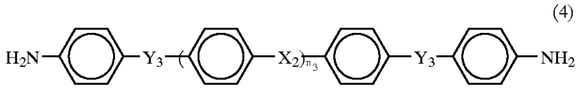

wherein, $Y_3$ is independently oxygen atom or $CH_2$ group; each $X_2$ is independently a single bond, oxygen atom, or a linear alkyl group having 1 to 6 carbon atoms; and $n_3$ is an integer from 0 to 2.

According to a third aspect of the present invention, there is provided a polyamic acid composition according to the second aspect, wherein the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2.

According to a fourth aspect of the present invention, there is provided a polyamic acid composition according to the second aspect, wherein the ratio of the aliphatic tetracarboxylic dianhydride to the alicyclic tetracarboxylic dianhydride in polyamic acid A is 90/10 to 30/70 (mole ratio); and the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2.

According to a fifth aspect of the present invention, there is provided a polyamic acid composition according to the second aspect, wherein the aliphatic tetracarboxylic dianhydride in the polyamic acid A is butane tetracarboxylic dianhydride, the alicyclic tetracarboxylic dianhydride in the polyamic acid A is cyclobutane tetracarboxylic dianhydride, the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2, and the aromatic tetracarboxylic dianhydride in the polyamic acid B is pyromellitic dianhydride.

According to a sixth aspect of the present invention, there is provided a polyamic acid composition according to the second aspect, wherein the polyamic acid A comprises an acid component containing cyclobutane tetracarboxylic dianhydride and butane tetracarboxylic dianhydride and an amine component containing a diamine of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2, and the aromatic tetracarboxylic dianhydride in the polyamic acid B is pyromellitic dianhydride.

According to a seventh aspect of the present invention, there is provided a polyamic acid composition according to the second aspect, wherein the aliphatic tetracarboxylic dianhydride in the polyamic acid A is butane tetracarboxylic dianhydride, the alicyclic tetracarboxylic dianhydride in the polyamic acid A is cyclobutane tetracarboxylic dianhydride; the ratio of the former to the latter is 90/10 to 30/70 (mole ratio); and in the general formula (1), $X_1$ is $CH_2$ or $CH_2CH_2$, each $R_1$ is hydrogen atom; and the aromatic tetracarboxylic dianhydride in the polyamic acid B is pyromellitic dianhydride.

According to an eighth aspect of the present invention, there is provided an aligning film for liquid crystal display elements containing a polyimide obtained from a composition according to any of the first through seventh aspects.

According to a ninth aspect of the present invention, there is provided a liquid crystal display element using an aligning film for liquid crystal display elements according to the eighth aspect.

According to a tenth aspect of the present invention, there is provided a liquid crystal display element according to the ninth aspect, wherein the liquid crystal composition contains at least one compound selected from those represented by general formulas (5), (6), and (7).

(5)

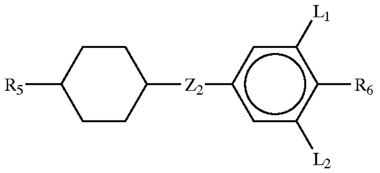

(6)

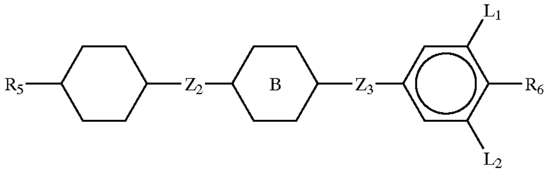

(7)

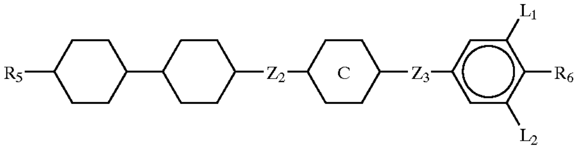

wherein, $R_5$ is an alkyl group having 1 to 10 carbon atoms in which optional, nonadjacent methylene groups may be substituted by —O— or —CH═CH—, and in which optional hydrogen atoms may be substituted by fluorine atoms; $R_6$ is fluorine atom, chlorine atom, —$OCF_3$, —$OCF_2H$, —$CF_3$, —$CF_2H$, —$CFH_2$, —$OCF_2CF_2H$ or —$OCF_2CFHCF_3$; each of $L_1$ and $L_2$ is independently hydrogen atom or fluorine atom; each of $Z_2$ and $Z_3$ is independently 1,2-ethylene, 1,4-butylene, —COO—, —$CF_2O$—, —$OCF_2$—, —CH═CH—, or a single bond; ring B is trans-1,4-cyclohexylene, 1,3-dioxane-2,5-diyl, or 1,4-phenylene in which hydrogen atoms may be substituted by fluorine atoms; and ring C is trans-1,4-cyclohexylene, or 1,4-phenylene in which hydrogen atoms may be substituted by fluorine atoms.

According to an eleventh aspect of the present invention, there is provided a liquid crystal display element according to the ninth aspect, wherein the liquid crystal composition contains at least one compound selected from those represented by general formulas (8) and (9).

(8)

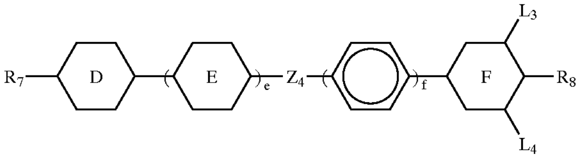

(9)

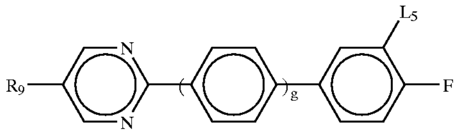

wherein, each of $R_7$ and $R_9$ is independently an alkyl group having 1 to 10 carbon atoms in which optional, nonadjacent methylene groups may be substituted by —O— or —CH═CH—, and in which optional hydrogen atoms may be substituted by fluorine atoms; $R_8$ is a —CN group or —C≡C—CN; ring D is trans-1,4-cyclohexylene, 1,4-phenylene, 1,3-dioxane-2,5-diyl, or pyrimidine-2,5-diyl; ring E is trans-1,4-cyclohexylene, 1,4-phenylene in which hydrogen atoms may be substituted by fluorine atoms, or pyrimidine-2,5-diyl; ring F is trans-1,4-cyclohexylene or 1,4-phenylene; $Z_4$ is 1,2-ethylene, —COO—, or a single bond; each of $L_3$, $L_4$, and $L_5$ is independently hydrogen atom or fluorine atom; and each of e, f, and g is independently 0 or 1.

According to a twelfth aspect of the present invention, there is provided a liquid crystal display element according to the ninth aspect, wherein the liquid crystal composition contains at least one compound selected from those represented by general formulas (10), (11), and (12).

(10)

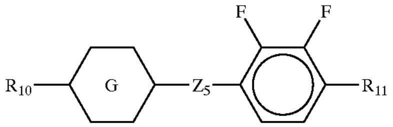

(11)

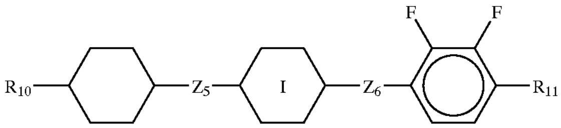

(12)

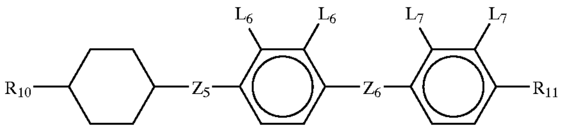

wherein, each of $R_{10}$ and $R_{11}$ is independently an alkyl group having 1 to 10 carbon atoms in which optional, nonadjacent methylene groups may be substituted by —O— or —CH═CH—, and in which optional hydrogen atoms may be substituted by fluorine atoms; each of rings G and I is independently trans-1,4-cyclohexylene or 1,4-phenylene; each of $L_6$ and $L_7$ is independently hydrogen atom or fluorine atom, but $L_6$ and $L_7$ are not hydrogen atoms simultaneously; and each of $Z_5$ and $Z_6$ is independently 1,2-ethylene, —COO—, or a single bond.

According to a thirteenth aspect of the present invention, there is provided a liquid crystal display element according to the ninth aspect, wherein the liquid crystal composition contains as the first component thereof at least one compound selected from those represented by general formulas (5), (6), and (7), and as the second component thereof at least one compound selected those represented by general formulas (13), (14), and (15).

(13)

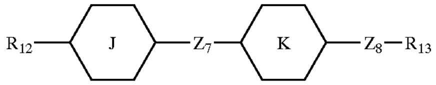

(14)

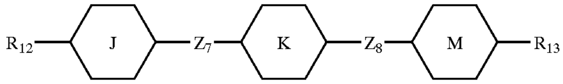

-continued (15)

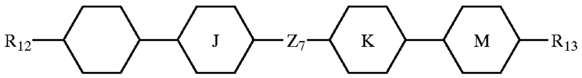

wherein, each of $R_{12}$ and $R_{13}$ is independently an alkyl group having 1 to 10 carbon atoms in which optional, nonadjacent methylene groups may be substituted by —O— or —CH═CH—, and in which optional hydrogen atoms may be substituted by fluorine atoms; each of rings J, K, and M is independently trans-1,4-cyclohexylene, pyrimidine-2, 5-diyl, or 1,4-phenylene in which hydrogen atoms may be substituted by fluorine atoms; and each of $Z_7$ and $Z_8$ is independently 1,2-ethylene, —C≡C—, —COO—, —CH═CH—, or a single bond.

According to a fourteenth aspect of the present invention, there is provided a liquid crystal display element according to the ninth aspect, wherein the liquid crystal composition contains as the first component thereof at least one compound selected from those represented by general formulas (8), and (9), and contains as the second component thereof at least one compound selected from those represented by general formulas (13), (14), and (15).

According to a fifteenth aspect of the present invention, there is provided a liquid crystal display element according to the ninth aspect, wherein the liquid crystal composition contains as the first component thereof at least one compound selected from those represented by general formulas (10), (11), and (12), and contains as the second component thereof at least one compound selected from those represented by general formulas (13), (14), and (15). According to a sixteenth aspect of the present invention, there is provided a liquid crystal display element according to the ninth aspect, wherein the liquid crystal composition contains as the first component thereof at least one compound selected from those represented by general formulas (5), (6), and (7); contains as the second component thereof at least one compound selected from those represented by general formulas (8) and (9); and contains as the third component thereof at least one compound selected from those represented by general formulas (13), (14), and (15).

According to a seventeenth aspect of the present invention, there is provided a liquid crystal display element according to any of the tenth through sixteenth aspects, wherein the liquid crystal composition further contains one or more optically active compounds.

DETAILED DESCRIPTION OF INVENTION

Figure 1:
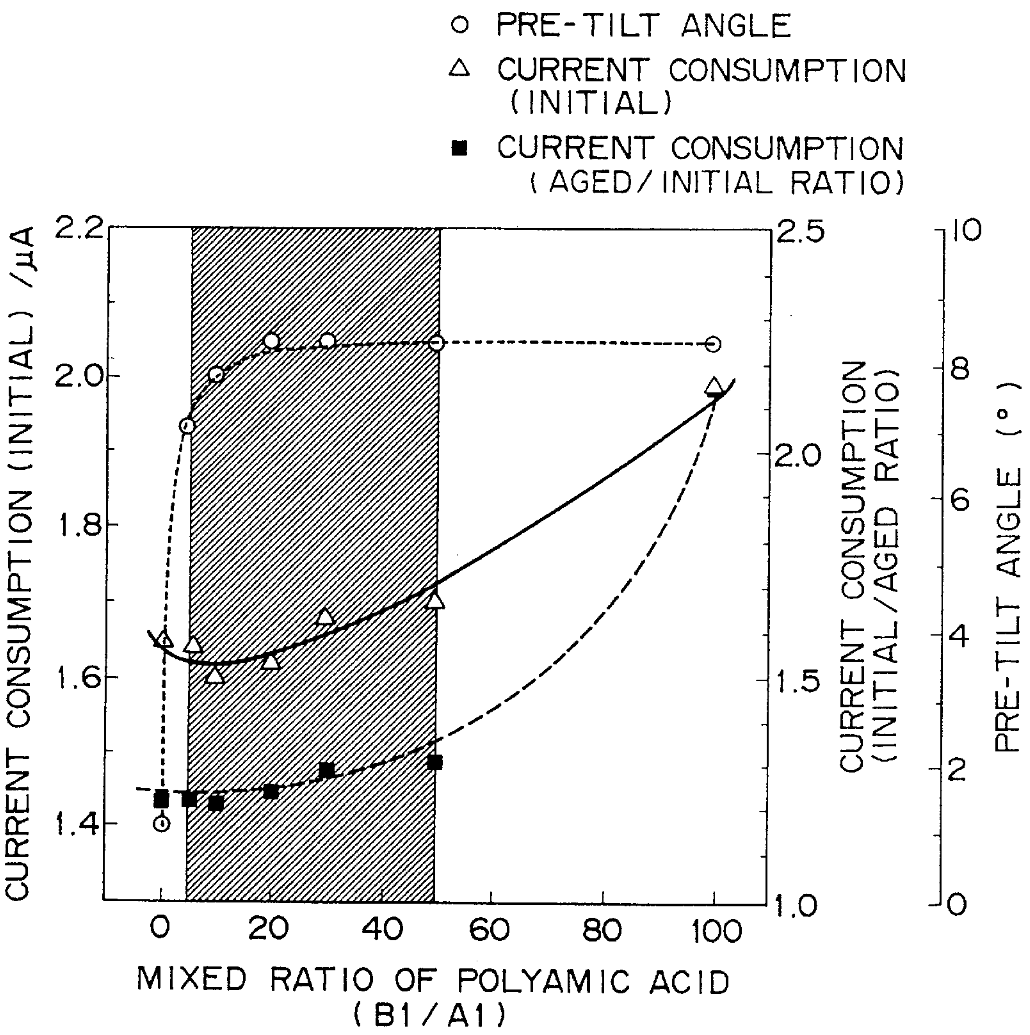
FIG. 1 is an area diagram showing the relationship between the pre-tilt angles, and initial values and aged/initial ratios of current consumption. The horizontal axis indicates the ratio of the amount of the polyamic acid B1 to the amount of the polyamic acid A1.

The present invention will be described in detail below.

The alignment material according to the present invention is a polyamic acid composition containing a polyamic acid A having excellent electrical properties and a polyamic acid B enabling an increase in the pre-tilt angle of a liquid crystal molecule, together with a solvent. The ratio of the polyamic acid A to the polyamic acid B, A/B, is 50/50 to 95/5 (by weight).

The acid component of the tetracarboxylic dianhydride of the polyamic acid A is a tetracarboxylic dianhydride-based component containing at least one aliphatic tetracarboxylic dianhydride, or at least one alicyclic tetracarboxylic dianhydride and at least one aliphatic tetracarboxylic dianhydride, and the combination of an alicyclic tetracarboxylic dianhydride and an aliphatic tetracarboxylic dianhydride is preferred. The amine component of the polyamic acid A is a component based on at least one aromatic diamine selected from diamines represented by formula (1). Unless otherwise specified, acid and amine components described herein and used as materials mean one component or more.

The tetracarboxylic dianhydride component of the polyamic acid B contains 50 mole % or more of at least one aromatic tetracarboxylic dianhydride, and the amine component of the polyamic acid B contains as an essential component thereof at least one diamine having on the side chain thereof a group that can increase the pre-tilt angle of liquid crystals.

As described above, the ratio of the polyamic acid A to the polyamic acid B, A/B, preferably falls within the range of 50/50 to 95/5 (by weight). If the content of the polyamic acid B component is less than 5% by weight, the pre-tilt angle of liquid crystals will decrease; whereas if the content of the polyamic acid B component is more than 50% by weight, the pre-tilt angle will not necessarily increase, but electrical properties will lower (see FIG. 1). However, when a polyamic acid B excels in electrical properties and provides an adequate pre-tilt angle, more than 50% by weight such a polyamic acid B may be used.

Alicyclic tetracarboxylic dianhydrides which can be used as the tetracarboxylic dianhydrides of the polyamic acid A specifically include cyclobutane tetracarboxylic dianhydride, cyclopentane tetracarboxylic dianhydride, bicyclo[2,2,2]-octo-7-ene-2,3,5,6-tetracarboxylic dianhydride, cyclohexane-1,2,5,6-tetracarboxylic dianhydride, 3,3'-bicyclohexyl-1,1',2,2'-tetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-tetrahydro-2,5-dioxo-3-furanyl)-naphtho[1,2,-c]-furan-1,3-dione, 3,5,6-tricarboxynorbornane-2-acetic dianhydride, 2,3,4,5-tetrahydrofuran tetracarboxylic dianhydride, and alicyclic tetracarboxylic dianhydrides partially substituted by lower alkyl group such as methyl or ethyl group. Among these, cyclobutane tetracarboxylic dianhydride, cyclopentane tetracarboxylic dianhydride, tricarboxycyclopentyl acetic dianhydride, and cyclohexane tetracarboxylic dianhydride are particularly preferably used.

Aliphatic tetracarboxylic dianhydrides which can be used preferably as the tetracarboxylic dianhydrides of the polyamic acid A specifically include ethylene tetracarboxylic dianhydride, butane tetracarboxylic dianhydride, pentane tetracarboxylic dianhydride, hexane tetracarboxylic dianhydride, and heptane tetracarboxylic dianhydride.

Other than these, an aromatic tetracarboxylic dianhydride, which will be described later, may be added in an amount so as not to deviate from the scope of the present invention. Such an amount is 90 mole % or less, preferably 80 mole % or less.

As the tetracarboxylic dianhydrides of the polyamic acid A, the combination of an aliphatic tetracarboxylic dianhydride and an aromatic tetracarboxylic dianhydride is more preferable than an aliphatic tetracarboxylic dianhydride alone, from the viewpoint of the pre-tilt angle of liquid crystals and electrical properties. However, unless the alignment of liquid crystals and electrical properties are adversely affected, the use of an aliphatic tetracarboxylic dianhydride alone raises no problems.

On the other hand, although pyromellitic dianhydride is preferably used as the aromatic tetracarboxylic dianhydride of the polyamic acid B, there may be used, excepting pyromellitic dianhydride, aromatic tetracarboxylic dianhydrides such as 3,3',4,4'-diphenyl tetracarboxylic dianhydride, 3,3',4,4'-benzophenonetetracarboxylic dianhydride, naphthalic dianhydrides (2,3,6,7-naphthalic dianhydride etc.), 3,3',4,4'-biphenylsulphonictetracarboxylic dianhydride, 3,3',4,4'-biphenylethertetracarboxylic dianhydride, 3,3',4,4'-dimethyldiphenylsilanetetracarboxylic dianhydride, 4,4'-bis (3,4-dicarboxyphenoxy)diphenylsulfide dianhydride, 4,4'-bis(3,4-dicarboxyphenoxy)diphenylsulphone dianhydride, 4,4'-bis(3,4-dicarboxyphenoxy)diphenylpropane dianhydride, 3,3',4,4'-perfluoropyridenediphthalic dianhydride, 3,3',4,4'-biphenyltetracarboxylic dianhydride, bis(phthalic)phenylsulphine oxide dianhydride, p-phenylene-bis(triphenylphthalic) dianhydride, m-phenylene-bis(triphenylphthalic) dianhydride, bis (triphenylphthalic)-4,4'-dephenylether dianhydride, or bis (triphenylphthalic)-4,4'-diphenylmethane dianhydride. Of these compounds, those containing oxygen or sulfur are not preferred because they tend to degrade electrical properties, but they may be used under certain conditions.

Since the polyamic acid B is a component that determines the pre-tilt angle and alignment of liquid crystals, these properties should be regarded more important than electrical properties. In this sense, alicyclic tetracarboxylic dianhydrides and aliphatic tetracarboxylic dianhydrides present somewhat of a problem in the ability of controlling alignment, and in the case of low-temperature baking at 180° C. or below, they present a problem in the stability of alignment in that alignment decays easily. In this regard, aromatic tetracarboxylic dianhydrides excel in the stability of alignment. Therefore, the acid component of the polyamic acid B preferably contains 50 mole % or more aromatic tetracarboxylic dianhydrides. On the other hand, since the combined use of alicyclic and aliphatic tetracarboxylic dianhydrides is rather favorable for electrical properties, when the electrical properties are regarded important, the combined use to the extent where the alignment is not affected is preferred.

As the amine component of the polyamic acid A, the aromatic diamines represented by the general formula (1) are used.

These types of diamine compound, when used in the aligning film of liquid crystals, are more favorable for the electrical properties of liquid crystal display elements than are other diamine components, such as amine components in which $X_1$ is an oxygen atom, CO, $C(CF_3)_2$, or COO. Therefore, these amine compounds are used as the main diamine components of the aligning film of the present invention, and are preferably used in particular as the main component of the amine component of the polyamic acid A.

Examples of these compounds include the following:

When $R_1$ is a hydrogen atom:

4,4'-diaminodiphenylmethane,
4,4'-diamino-1,2-diphenylethane,
4,4'-diamino-1,3-diphenylpropane,
and 2,2-bis(4-aminophenyl)propane;

When $R_1$ is a methyl radical:

bis(4-amino-3-methylphenyl)methane,
1,2-bis(4-amino-3-methylphenyl)ethane,
1,3-bis(4-amino-3-methylphenyl)propane,
bis(4-amino-2-methylphenyl)methane,
1,2-bis(4-amino-2-methylphenyl)ethane,
and 1,3-bis(4-amino-2-methylphenyl)propane.

Preferably, in formula (1), $X_1$ is $CH_2$, $CH_2CH_2$, $CH_2CH_2CH_2$, or $C(CH_3)_2$; each $R_1$ is independently a hydrogen atom or $CH_3$; and each of a and b is 1 or 2; more preferably, $X_1$ is $CH_2$ or $CH_2CH_2$; and each $R_1$ is a hydrogen atom.

In addition to these, diamines represented by formulas (2), (3), and (4) described above may be added as required. However, the amount of a diamine represented by formula (1) preferably exceeds 50 mole %.

The essential diamine component of the polyamic acid B is at least one diamine compound having a side chain which increases the pre-tilt angle of the liquid crystal molecule. The diamine component having a side chain means a diamine component having an axis in the lateral direction relative to the main axis of the polyimide or the polyamic acid structure. For example, it means a diamine component having a side chain from the linking group of the main axis; or having a group in the lateral direction from the aromatic or alicyclic group in the main axis.

As diamines which increase the pre-tilt angle of the liquid crystal, diamines represented by formula (2) are exemplified. Specifically, examples of the compounds in which both l and m are 0; $n_1$ is 1; and $Y_1$ is an oxygen atom are as follows:

1,1-bis[4-(4-aminophenoxy)phenyl]cyclohexane,
1,1-bis[4-(4-aminophenoxy)phenyl]-4-methylcyclohexane,
1,1-bis[4-(4-aminophenoxy)phenyl]-4-ethylcyclohexane,
1,1-bis[4-(4-aminophenoxy)phenyl]-4-n-propylcyclohexane,
1,1-bis[4-(4-aminophenoxy)phenyl]-4-n-butylcyclohexane,
1,1-bis[4-(4-aminophenoxy)phenyl]-4-n-pentylcyclohexane,
1,1-bis[4-(4-aminophenoxy)phenyl]-4-n-hexylcyclohexane,
1,1-bis[4-(4-aminophenoxy)phenyl]-4-n-heptylcyclohexane,
1,1-bis[4-(4-aminophenoxy)phenyl]-4-n-octylcyclohexane,
1,1-bis[4-(4-aminophenoxy)phenyl]-4-n-nonylcyclohexane,
1,1-bis[4-(4-aminophenoxy)phenyl]-4-n-decylcyclohexane,
1,1-bis[4-(4-aminophenoxy)phenyl]-4-n-undecylcyclohexane,
1,1-bis[4-(4-aminophenoxy)phenyl]-4-n-dodecylcyclohexane,
1,1-bis[4-(4-aminophenoxy)phenyl]-4-n-tridecylcyclohexane,
1,1-bis[4-(4-aminophenoxy)phenyl]-4-n-tetradecylcyclohexane,
1,1-bis[4-(4-aminophenoxy)phenyl]-4-n-pentadecylcyclohexane, and the like.

Examples of the compounds in which l, m, and n, are all 0 are as follows:

1,1-bis(4-aminophenyl)cyclohexane,
1,1-bis(4-aminophenyl)-4-methylcyclohexane,
1,1-bis(4-aminophenyl)-4-ethylcyclohexane,
1,1-bis(4-aminophenyl)-4-n-propylcyclohexane,
1,1-bis(4-aminophenyl)-4-n-butylcyclohexane,
1,1-bis(4-amino phenyl)-4-n-pentylcyclohexane,
1,1-bis(4-aminophenyl)-4-n-hexylcyclohexane
1,1-bis(4-aminophenyl)-4-n-heptylcyclohexane,
1,1-bis(4-aminophenyl)-4-n-octylcyclohexane,
1,1-bis(4-aminophenyl)-4-n-nonylcyclohexane,
1,1-bis(4-aminophenyl)-4-n-decylcyclohexane,
1,1-bis(4-aminophenyl)-4-n-undecylcyclohexane,
1,1-bis(4-aminophenyl)-4-n-dodecylcyclohexane,
1,1-bis(4-aminophenyl)-4-n-tridecylcyclohexane, 1,1-bis(4-aminophenyl)-4-n-tetradecylcyclohexane,
1,1-bis(4-aminophenyl)-4-n-pentadecylcyclohexane, and the like.

Examples of the compounds in which l is 1; ring A is a cyclohexyl group; and both m and n, are 0 are as follows:
1,1-bis(4-aminophenyl)-4-cyclohexylcyclohexane,
1,1-bis(4-aminophenyl)-4-(4-methyl-trans-cyclohexyl) it cyclohexane,
1,1-bis(4-aminophenyl)-4-(4-ethyl-trans-cyclohexyl) cyclohexane,
1,1-bis(4-aminophenyl)-4-(4-n-propyl-trans-cyclohexyl) cyclohexane,
1,1-bis(4-aminophenyl)-4-(4-n-butyl-trans-cyclohexyl) cyclohexane,
1,1-bis(4-aminophenyl)-4-(4-n-pentyl-trans-cyclohexyl) cyclohexane,
1,1-bis(4-aminophenyl)-4-(4-n-hexyl-trans-cyclohexyl) cyclohexane,
1,1-bis(4-aminophenyl)-4-(4-n-heptyl-trans-cyclohexyl) cyclohexane,
1,1-bis(4-aminophenyl)-4-(4-n-octyl-trans-cyclohexyl) cyclohexane,
1,1-bis(4-aminophenyl)-4-(4-n-nonyl-trans-cyclohexyl) cyclohexane,
1,1-bis(4-aminophenyl)-4-(4-n-decyl-trans-cyclohexyl) cyclohexane,
1,1-bis(4-aminophenyl)-4-(4-n-undecyl-trans-cyclohexyl) cyclohexane,
1,1-bis(4-aminophenyl)-4-(4-n-docecyl-trans-cyclohexyl) cyclohexane,
1,1-bis(4-aminophenyl)-4-(4-n-tridecyl-trans-cyclohexyl) cyclohexane,
1,1-bis(4-aminophenyl)-4-(4-n-tetradecyl-trans-cyclohexyl) cyclohexane,
1,1-bis(4-aminophenyl)-4-(4-n-pentadecyl-trans-cyclohexyl) cyclohexane, and the like.

Examples of the compounds in which l is 1; ring A is a cyclohexyl group; m is 0, n, is 1; and $Y_1$ is an oxygen atom are as follows:
1,1-bis[4-(4-aminophenoxy)phenyl]-4-(cyclohexyl) cyclohexane,
1,1-bis[4-(4-aminophenoxy)phenyl]-4-(4-methylcyclohexyl) cyclohexane,
1,1-bis[4-(4-aminophenoxy)phenyl]-4-(4-ethylcyclohexyl) cyclohexane,
1,1-bis[4-(4-aminophenoxy)phenyl]-4-(4-propylcyclohexyl) cyclohexane,
1,1-bis[4-(4-aminophenoxy)phenyl]-4-(4-butylcyclohexyl) cyclohexane,
1,1-bis[4-(4-aminophenoxy)phenyl]-4-(4-pentylcyclohexyl) cyclohexane,
1,1-bis[4-(4-aminophenoxy)phenyl]-4-(4-hexylcyclohexyl) cyclohexane,
1,1-bis[4-(4-aminophenoxy)phenyl]-4-(4-heptylcyclohexyl) cyclohexane,
1,1-bis[4-(4-aminophenoxy)phenyl]-4-(4-octylcyclohexyl) cyclohexane, and the like.

Examples of the compounds in which both l and m are 1; ring A is a cyclohexyl group; $Z_1$ is $CH_2$; and n, is 0 are as follows:
1,1-bis(4-aminophenyl)-4-(cyclohexylmethyl)cyclohexane,
1,1-bis(4-aminophenyl)-4-[(4-methylcyclohexyl)methyl] cyclohexane,
1,1-bis(4-aminophenyl)-4-[(4-ethylcyclohexyl)methyl] cyclohexane,
1,1-bis(4-aminophenyl)-4-[(4-propylcyclohexyl)methyl] cyclohexane,
1,1-bis(4-aminophenyl)-4-[(4-butylcyclohexyl)methyl] cyclohexane,
1,1-bis(4-aminophenyl)-4-[(4-pentylcyclohexyl)methyl] cyclohexane,
1,1-bis(4-aminophenyl)-4-[(4-hexylcyclohexyl)methyl] cyclohexane,
1,1-bis(4-aminophenyl)-4-[(4-heptylcyclohexyl)methyl] cyclohexane,
1,1-bis(4-aminophenyl)-4-[(4-octylcyclohexyl)methyl] cyclohexane, and the like.

Examples of the compounds in which both l and m are 1; ring A is a phenyl group; $z_1$ is $CH_2$; $n_1$ is 1; and $Y_1$ is an oxygen atom are as follows:
1,1-bis[4-(4-aminophenoxy)phenyl]-4-(phenylmethyl) cyclohexane,
1,1-bis[4-(4-aminophenoxy)phenyl]-4-[(4-methylphenyl) methyl]cyclohexane,
1,1-bis[4-(4-aminophenoxy)phenyl]-4-[(4-ethylphenyl) methyl]cyclohexane,
1,1-bis[4-(4-aminophenoxy)phenyl]-4-[(4-propylphenyl) methyl]cyclohexane,
1,1-bis[4-(4-aminophenoxy)phenyl]-4-[(4-butylphenyl) methyl]cyclohexane,
1,1-bis[4-(4-aminophenoxy)phenyl]-4-[(4-pentylphenyl) methyl]cyclohexane,
1,1-bis[4-(4-aminophenoxy)phenyl]-4-[(4-hexylphenyl) methyl]cyclohexane,
1,1-bis[4-(4-aminophenoxy)phenyl]-4-[(4-heptylphenyl) methyl]cyclohexane,
1,1-bis[4-(4-aminophenoxy)phenyl]-4-[(4-octylphenyl) methyl]cyclohexane, and the like.

Examples of the compounds in which 1 and m are 1; ring A is a phenyl group; $Z_1$ is $CH_2$; and n, is 0 are as follows:
1,1-bis(4-aminophenyl)-4-(phenylmethyl)cyclohexane,
1,1-bis(4-aminophenyl)-4-[(4-methylphenyl)methyl] cyclohexane,
1,1-bis(4-aminophenyl)-4-[(4-ethylphenyl)methyl] cyclohexane,
1,1-bis(4-aminophenyl)-4-[(4-propylphenyl)methyl] cyclohexane,
1,1-bis(4-aminophenyl)-4-[(4-butylphenyl)methyl] cyclohexane,
1,1-bis(4-aminophenyl)-4-[(4-pentylphenyl)methyl] cyclohexane,
1,1-bis(4-aminophenyl)-4-[(4-hexylphenyl)methyl] cyclohexane,
1,1-bis(4-aminophenyl)-4-[(4-heptylphenyl)methyl] cyclohexane,
1,1-bis(4-aminophenyl)-4-[(4-octylphenyl)methyl] cyclohexane, and the like.

Examples of the compounds in which both l and m are 1; ring A is a phenyl group; $Z_1$ is $CH_2$; $n_1$ is 1; and $Y_1$ is $CH_2$ are as follows:
1,1-bis(4-((4-aminophenyl)methyl)phenyl)-4-(phenylmethyl) cyclohexane,
1,1-bis(4-((4-aminophenyl)methyl)phenyl)-4-[(4-methylphenyl) methyl]cyclohexane,
1,1-bis(4-((4-aminophenyl)methyl)phenyl)-4-[(4-ethylphenyl) methyl]cyclohexane,
1,1-bis(4-((4-aminophenyl)methyl)phenyl)-4-[(4-propylphenyl) methyl]cyclohexane,
1,1-bis(4-((4-aminophenyl)methyl)phenyl)-4-[(4-butylphenyl) methyl]cyclohexane,
1,1-bis(4-((4-aminophenyl)methyl)phenyl)-4-[(4-pentylphenyl) methyl]cyclohexane,
1,1-bis(4-((4-aminophenyl)methyl)phenyl)-4-[(4-hexylphenyl) methyl]cyclohexane, 1,1-bis(4-((4-aminophenyl)methyl)phenyl)-4-[(4-heptylphenyl) methyl]cyclohexane, 1,1-bis(4-((4-aminophenyl)methyl)phenyl)-4-[(4-octylphenyl) methyl]cyclohexane, and the like.

Examples of the compounds in which both l and m are 0; $n_1$ is 1; and $Y_1$ is $CH_2$ are as follows:

1,1-bis(4-((4-aminophenyl)methyl)phenyl)cyclohexane, 1,1-bis(4-((4-aminophenyl)methyl)phenyl)-4-methylcyclohexane, 1,1-bis(4-((4-aminophenyl)methyl)phenyl)-4-ethylcyclohexane, 1,1-bis(4-((4-aminophenyl)methyl)phenyl)-4-propylcyclohexane, 1,1-bis(4-((4-aminophenyl)methyl)phenyl)-4-butylcyclohexane, 1,1-bis(4-((4-aminophenyl)methyl)phenyl)-4-pentylcyclohexane, 1,1-bis(4-((4-aminophenyl)methyl)phenyl)-4-hexylcyclohexane, 1,1-bis(4-((4-aminophenyl)methyl)phenyl)-4-heptylcyclohexane, 1,1-bis(4-((4-aminophenyl)methyl)phenyl)-4-octylcyclohexane, and the like.

Compounds not listed above but represented by formula (2) fall within the scope of the present invention.

Of these compounds, for example, when both m and l are 0, when $R_2$ is a hydrogen atom, or when the length of the alkyl group is short, since the slope of the pre-tilt angle versus the quantity of the polyamic acid B is gentle and positive and a relatively large quantity of the polyamic acid B is required before equilibrium is reached, the length of the alkyl group is preferably not short. On the other hand, when two or more rings are present in the side chain, good results are obtained even if $R_2$ is a hydrogen atom. In the present invention, when the polyamic acid B is inferior in electric properties to the polyamic acid A, the use of a large quantity of the polyamic acid B in relation to the quantity of the polyamic acid A is not preferred.

As diamine compounds that increase the pre-tilt angle, there can be used compounds represented by formula (3) shown below, aromatic diamine compounds whose hydrogen atoms are substituted by alkyl groups or mesogen groups (liquid crystal groups), or amine components which increase the tilt angle of the liquid crystal aligning films. For these components, a large variety of amine components have already been known from published patents and the like.

Examples of diamine components which can be used in the present invention that have side chains and increase the pre-tilt angle include the following diamine compounds, but are not limited to these examples, and other diamine compounds that increase the pre-tilt angle can be used so long as the advantages of the present invention are not affected.

Also in formula (3), the $Y_2$ component is preferably an aliphatic group rather than an ether, ester, or ketone group because of the excellent electrical properties. Also, if the number of carbon atoms in $R_3$ and $R_4$ is small, the slope of the pre-tilt angle versus the quantity of the polyamic acid B is gentle and positive. Therefore, preferably at least one of $R_3$ and $R_4$ has three or more carbon atoms.

Specific examples of these compounds include the following compounds, but other compounds represented by formula (3) fall within the scope of these compounds.

Examples of compounds in which $Y_2$ is an oxygen atom and $n_2$ is 1 are as follows:

2,2-bis-[4-(aminophenoxy)phenyl]propane, 2,2-bis-[4-(aminophenoxy)phenyl]butane, 2,2-bis-[4-(aminophenoxy)phenyl]pentane, 2,2-bis-[4-(aminophenoxy)phenyl]hexane, 2,2-bis-[4-(aminophenoxy)phenyl]heptane, 2,2-bis-[4-(aminophenoxy)phenyl]octane, 2,2-bis-[4-(aminophenoxy)phenyl]nonane, 2,2-bis-[4-(aminophenoxy)phenyl]decane, 2,2-bis-[4-(aminophenoxy)phenyl]undecane, 2,2-bis-[4-(aminophenoxy)phenyl]dodecane, 2,2-bis-[4-(aminophenoxy)phenyl]tridecane, 2,2-bis-[4-(aminophenoxy)phenyl]tetradecane, 2,2-bis-[4-(aminophenoxy)phenyl]pentadecane, 2,2-bis-[4-(aminophenoxy)phenyl]hexadecane, 2,2-bis-[4-(aminophenoxy)phenyl]heptadecane, 2,2-bis-[4-(aminophenoxy)phenyl]octadecane, 2,2-bis-[4-(aminophenoxy)phenyl]nonadecane, and the like.

Examples of compounds in which $Y_2$ is $CH_2$ and $n_2$ is 1 are as follows:

2,2-bis-(4-((4-aminophenyl)methyl)phenyl)propane, 2,2-bis-(4-((4-aminophenyl)methyl)phenyl)butane, 2,2-bis-(4-((4-aminophenyl)methyl)phenyl)pentane, 2,2-bis-(4-((4-aminophenyl)methyl)phenyl)hexane, 2,2-bis-(4-((4-aminophenyl)methyl)phenyl)heptane, 2,2-bis-(4-((4-aminophenyl)methyl)phenyl)octane, 2,2-bis-(4-((4-aminophenyl)methyl)phenyl)nonane, 2,2-bis-(4-((4-aminophenyl)methyl)phenyl)decane, 2,2-bis-(4-((4-aminophenyl)methyl)phenyl)undecane, 2,2-bis-(4-((4-aminophenyl)methyl)phenyl)dodecane, 2,2-bis-(4-((4-aminophenyl)methyl)phenyl)tridecane, 2,2-bis-(4-((4-aminophenyl)methyl)phenyl)tetradecane, 2,2-bis-(4-((4-aminophenyl)methyl)phenyl)pentadecane, 2,2-bis-(4-((4-aminophenyl)methyl)phenyl)hexadecane, 2,2-bis-(4-((4-aminophenyl)methyl)phenyl)heptadecane, 2,2-bis-(4-((4-aminophenyl)methyl)phenyl)octadecane, 2,2-bis-(4-((4-aminophenyl)methyl)phenyl)nonadecane, 2,2-bis-(4-((4-aminophenyl)methyl)phenyl)perfluoropropane, 2,2-bis-(4-((4-aminophenyl)methyl)phenyl)perfluorobutane, 2,2-bis-(4-((4-aminophenyl)methyl)phenyl)perfluoropentane, 2,2-bis-(4-((4-aminophenyl)methyl)phenyl)perfluorohexane, 2,2-bis-(4-((4-aminophenyl)methyl)phenyl)perfluoroheptane, 2,2-bis-(4-((4-aminophenyl)methyl)phenyl)perfluorooctane, 2,2-bis-(4-((4-aminophenyl)methyl)phenyl)perfluorononane, 2,2-bis-(4-((4-aminophenyl)methyl)phenyl)perfluorodecane, 2,2-bis-(4-((4-aminophenyl)methyl)phenyl)perfluoroundecane, 2,2-bis-(4-((4-aminophenyl)methyl)phenyl)perfluorododecane, 2,2-bis-(4-((4-aminophenyl)methyl)phenyl)perfluorotridecane, 2,2-bis-(4-((4-aminophenyl)methyl)phenyl)perfluoro tetradecane, 2,2-bis-(4-((4-aminophenyl)methyl)phenyl)perfluoro pentadecane, 2,2-bis-(4-((4-aminophenyl)methyl)phenyl)perfluoro hexadecane, 2,2-bis-(4-((4-aminophenyl)methyl)phenyl)perfluoro heptadecane, 2,2-bis-(4-((4-aminophenyl)methyl)phenyl)perfluoro octadecane, 2,2-bis-(4-((4-aminophenyl)methyl)phenyl)perfluoro nonadecane, and the like.

Excepting the above compounds, examples of diamine compounds of the form of phenylene diamine having a side chain are as follows:

1,4-diamino-3-((4-alkylcyclohexyl)cyclohexyloxy)benzene,
1,4-diamino-3-((4-alkylphenyl)cyclohexyloxy)benzene,
1,4-diamino-3-((4-alkylterphenyl)oxy)benzene,
1,3-diamino-5-perfluoroalkylbenzene,
1,3-diamino-5-(2-dimethylperfluoro)ethane)benzene,
4-(4-trifluoromethylphenoxy)-2,3-diaminobenzene,
4-(4-fluorophenoxy)-1,3-diaminobenzene,
4-[3-(4-biphenyloxy)alkoxy-1,3-diaminobenzene,
4-[3-(4-trifluoromethoxybiphenyl-4-oxy)alkoxy-1,3-diaminobenzene,
1,4-diamino-(2-alkyl)benzene,
1,4-diamino-(2,5-dialkyl)benzene,
2-alkyloxy-1,4-diaminobenzene, and other diamine compounds having a phenylene diamine backbone with a steroid-based side chain and the like.

Even in the case of phenylene diamine compounds, a group constituting the side chain having 3 or more carbon atoms is more preferable than that having 1 or 2 carbon atoms, because such a group can easily increase the pre-tilt angle. Since substituting groups containing oxygen or sulfur are not preferable in terms of electrical properties, substituting groups not containing such groups are preferable, as in formulas (2) and (3). In the case of the polyamic acid B of the present invention, the electrical properties are little affected because the content of substituting groups containing oxygen or sulfur is relatively small.

As described above, the essential amine component of the polyamic acid B is at least one of diamines having a side chain which increases the pre-tilt angles of liquid crystal molecules, but there may also be used, for example, the combination of at least one of diamines represented by formula (1) or/and at least one of diamines represented by formula (4).

Examples of such diamines include the following compounds. Of course, all the diamines within the scope of formula (4) are included.

Examples of compounds in which $n_3$ is 0 are as follows:

1,4'-bis-(4-aminophenoxy)benzene, and
1,4'-bis-[(4-aminophenyl)methyl]benzene.

Examples of compounds in which $Y_3$ is an oxygen atom and $n_3$ is 1 are as follows:

4,4'-bis-(4-aminophenoxy)biphenyl,
bis-[4-(4-aminophenoxy)phenyl]ether,
bis-[4-(4-aminophenoxy)phenyl]methane,
1,2-bis-[4-(4-aminophenoxy)phenyl]ethane,
1,3-bis-[4-(4-aminophenoxy)phenyl]propane,
1,4-bis-[4-(4-aminophenoxy)phenyl]butane,
1,5-bis-[4-(4-aminophenoxy)phenyl]pentane, and
1,6-bis-[4-(4-aminophenoxy)phenyl]hexane.

Examples of compounds in which $Y_3$ is $CH_2$ and $n_3$ is 1 are as follows:

4,4'-bis-((4-aminophenyl)methyl)biphenyl,
bis-[4-((4-aminophenyl)methyl)phenyl]ether,
bis-[4-((4-aminophenyl)methyl)phenyl]methane,
1,2-bis-[4-((4-aminophenyl)methyl)phenyl]ethane,
1,3-bis-[4-((4-aminophenyl)methyl)phenyl]propane,
1,4-bis-[4-((4-aminophenyl)methyl)phenyl]butane,
1,5-bis-[4-((4-aminophenyl)methyl)phenyl]pentane, and
1,6-bis-[4-((4-aminophenyl)methyl)phenyl]hexane.

Examples of compounds in which $n_3$ is 2 are as follows:

1,4-bis-[4-(4-aminophenoxy)phenoxy]benzene,
1,4-bis-[(4-((4-aminophenyl)methyl)phenyl)methyl]benzene, and
1,4-bis-[3-(4-((4-aminophenyl)methyl)phenyl)propyl]benzene.

All the compounds which fall within the scope of formula (4) are included in the scope of the present invention.

In addition to these tetracarboxylic dianhydrides and diamines, monoamino compounds or/and monocarboxylic anhydride compounds which constitute the reacting end groups of the polyamic acids may be used in combination. In order to enhance the adhesion to the substrate, aminosilicon compounds or diaminosilicon compounds may be introduced.

Aminosilicon compounds include p-aminophenyl trimethoxysilane, p-aminophenyl triethoxysilane, m-aminophenyl trimethoxysilane, m-aminophenyl triethoxysilane, aminopropyl trimethoxysilane, and aminopropyl triethoxysilane.

Diaminosilicon compounds include 1,3-bis(3-aminopropyl)-1,1,3,3-tetraphenyl disiloxane, 1,3-bis(3-aminopropyl)-1,1,3,3-tetramethyl disiloxane, and 1,3-bis(4-aminobutyl)-1,1,3,3-tetramethyl disiloxane.

The diamine components used in the polyamic acid B comprise a diamine selected from diamines represented by formulas (1) and (4), and a diamine selected from those that increase the pre-tilt angle of liquid crystals (diamines represented by formulas (2) and (3)), the content of the latter being 3 to 100 mole %, preferably 20 to 80 mole %, and more preferably 30 to 50 mole %, depending on the ease of manufacture and the ease of controlling pre-tilt angles. If the amine components inducing the pre-tilt angle affect the electrical properties of the liquid crystal, the use of such a diamine should be limited to the minimum quantity for obtaining a required tilt angle. Use of diamines that increase the pre-tilt angle to a greater extent reduces the quantity of such diamines.

Although the ratio A/B of the quantity of the polyamic acid A to the polyamic acid B may be any ratio within the range of 50/50 to 95/5 (by weight), the process dependence of the pre-tilt angle tends to increase if the content of the polyamic acid B is low. Therefore, the quantity of the polyamic acid B component is preferably 5% by weight or more when the process dependence of the pre-tilt angle is taken into consideration. When the balance of the process dependence of the pre-tilt angle and electrical properties is a consideration, the quantity of the polyamic acid B is more preferably between 5 and 50% by weight.

Typically, the polyamic acid of the present invention is dissolved in a solvent, and the solution is used as an application solution. Although the polymer content (the total of the polyamic acid A and the polyamic acid B) in the application solution is any value from 0.1 to 40% by weight, the optimum content of the polymer component differs depending on the method for applying the alignment agent varnish to a substrate, and cannot be determined within a certain range. For the spinner method or the printing method normally employed, the content of the polymer component is preferably 0.5 to 10% by weight. If the polymer content is less than 0.5% by weight, the thickness of the aligning film becomes too thin, and if the content is more than 10% by weight, the thickness becomes too thick. The polymer content of 40% by weight or more is often not preferable because the viscosity is too high, and the solvent cannot be mixed well when the polymer is diluted.

Polymers such as other polyamic acids, polyamic esters, soluble polyimide, and polyamideimide may be used in combination with the polyamic acid A and the polyamic acid B unless the advantages of the present invention are impaired. Furthermore, a liquid crystal alignment agent containing more than one polyamic acid is used in the present invention. This alignment agent is imidized by heating. (Although the alignment agent is not required to be fully imidized, the imidization percentage after heating is preferably 40%.) Therefore, the same advantages are expected if a soluble polyimide A and a soluble polyimide B are used in place of the polyamic acids of the present invention. That is, the polyamic acid component of the present invention may comprise both polyamic acids, a soluble polyimide for one and a polyamic acid for the other, or soluble polyimides for both.

The solvent used for the application solution may normally be any solvent used for polyamic acids or soluble polyimides. Specifically, a non-protonic organic solvent that has affinity for polyamic acids (N-methyl-2-pyrrolidone, dimethylimidazolidinone, N-methylcaprolactam, N-methylpropionic acid amide, N,N-dimethylacetamide, dimethyl sulfoxide, N,N-dimethylformamide, N,N-diethylformamide, N,N-diethylacetamide, γ-butyrolactone, etc.) may be combined with other low-surface-tension solvent systems (alkyl lactates, 3-methyl-3-methoxy butanol, tetralin, isophorone, ethylene glycol monoalkyl ethers (e.g. ethylene glycol monobutyl ether), diethylene glycol monoalkyl ethers (e.g. diethylene glycol monoethyl ether), ethylene glycol monoalkyl or phenyl acetate, triethylene glycol monoalkyl ethers, propylene glycol monoalkyl ethers (e.g. propylene glycol monobutyl ether), dialkyl malonates (e.g. diethyl malonate), ethylene glycol monoalkyl acetates, diethylene glycol monoalkyl acetates, propylene glycol monoalkyl acetates, dipropylene glycol monoalkyl acetates, etc.) for improving the ease of application or other purposes. These solvents are often poor solvents compared with the previously mentioned solvents. For improvement of ease of application, combined use with these solvents is preferred.

As the method for applying the varnish dissolved with these solvents to a substrate forming a liquid crystal alignment element, there may be used any method normally employed. For example, the spinner method, the printing method, the dipping method, or the dropping method may be used for the application of such varnish.

Also, in heat treatment required for drying, or in dehydration or ring forming reactions, the same method as that for polyamic acids may be used. For example, heat treatment may be performed through the use of an oven, hot plate, or infrared furnace. After application of the varnish, preferably the solvent is evaporated at a relatively low temperature and heat treatment is performed at a temperature between 150 and 300° C. In the varnish of the present invention, there may be added a catalyst for promoting imidization, as well as a surface active agent for improving the ease of application and an anti-static agent for preventing generation of static electricity. Furthermore, a silane coupling agent or a titanium-based coupling agent may be added for improving adhesion with the substrate.

Although the present invention addresses an aligning film favorably used particularly in low-voltage-type STN-mode liquid crystal display elements, it may be used in other display elements such as TFT-mode elements.

Examples of specific liquid crystal compositions preferably used in the present invention in combination with this aligning film include compositions containing at least one compound selected from those represented by general formulas (5), (6), and (7).

Specific compounds are shown below; however, since not all the compounds represented by formulas (5), (6), and (7) can be shown, only examples of these compounds are shown. Therefore, compounds not shown here but represented by formulas (5), (6), and (7) fall within the scope of the present invention.

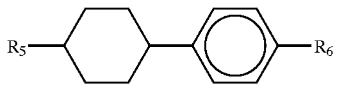

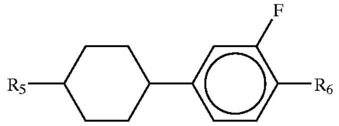

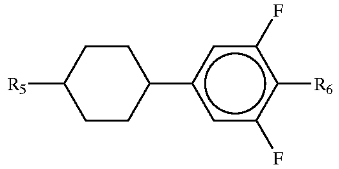

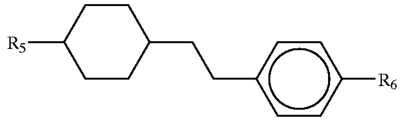

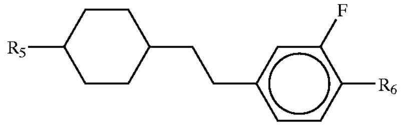

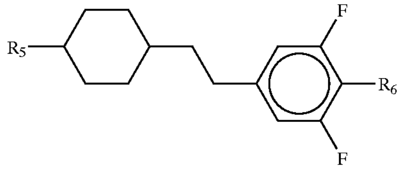

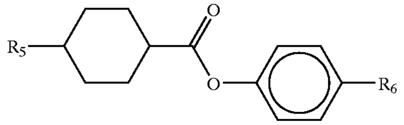

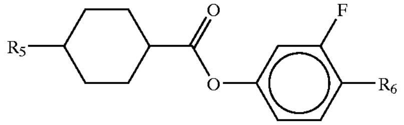

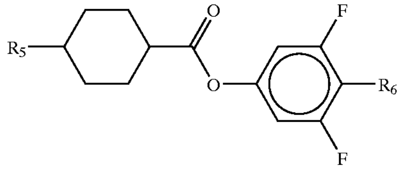

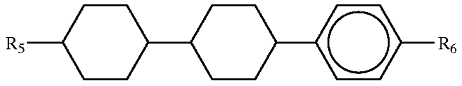

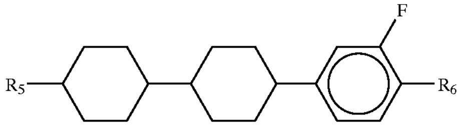

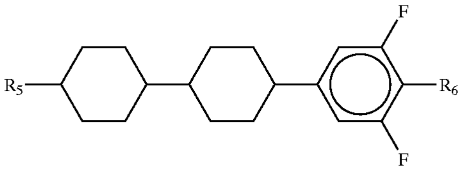

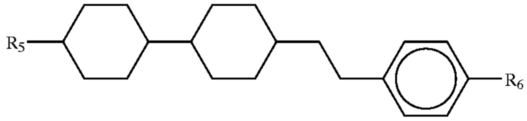

-continued
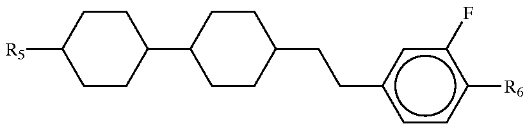
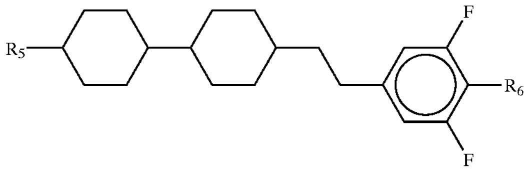
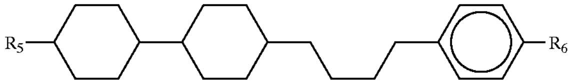
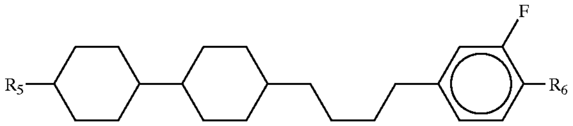
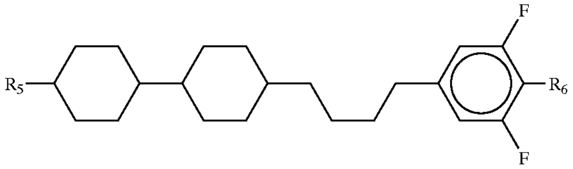
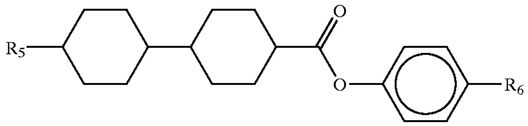
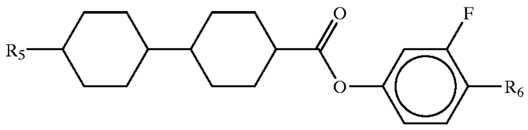
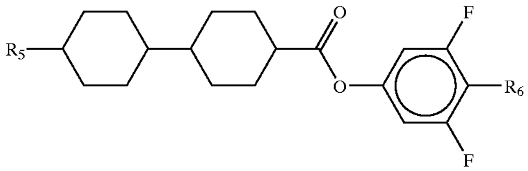
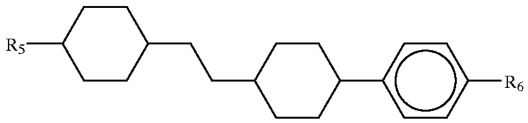
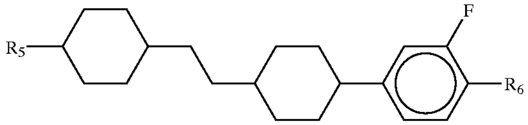
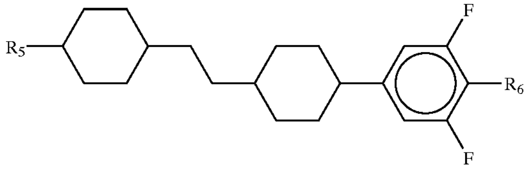
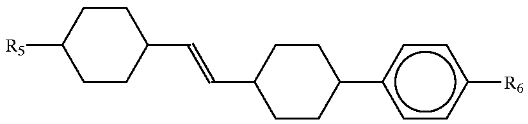
-continued
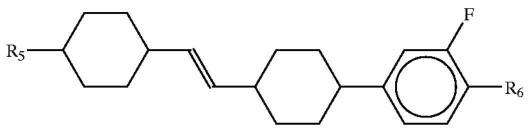
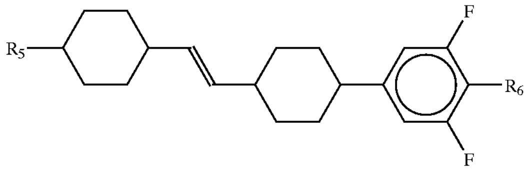
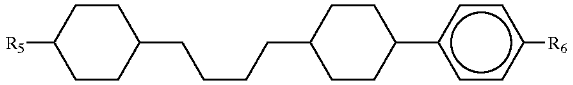
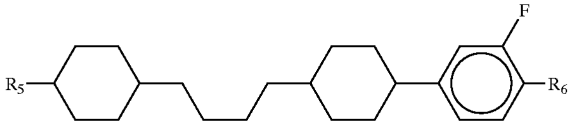
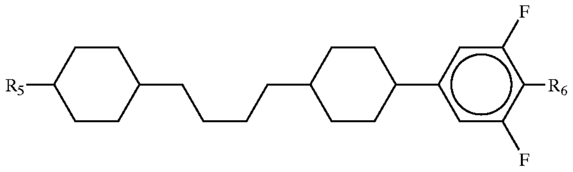
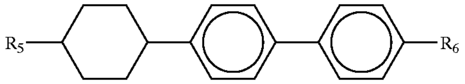
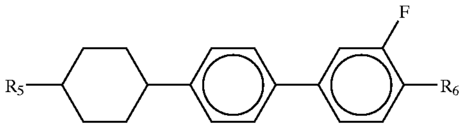
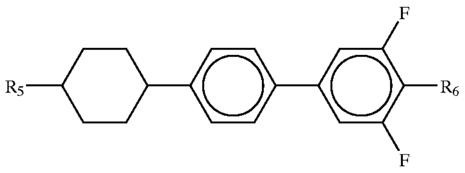
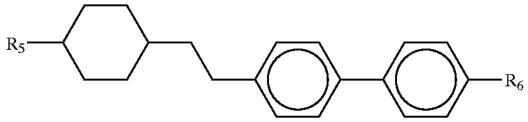
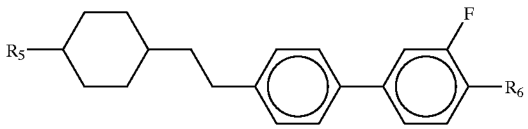
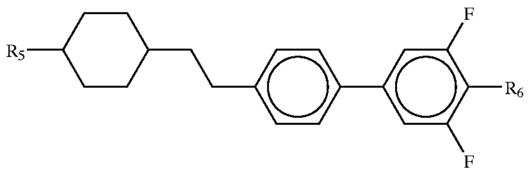
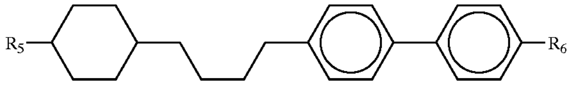
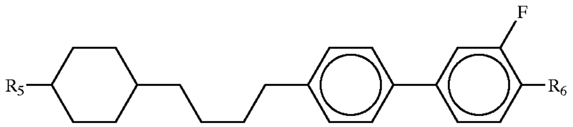

-continued
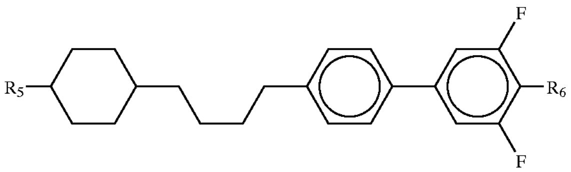
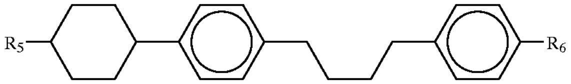
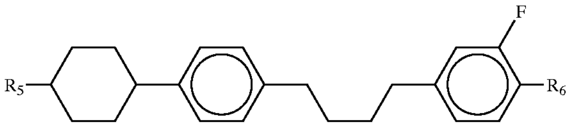
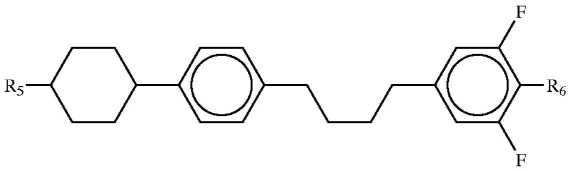
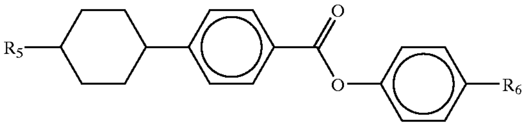
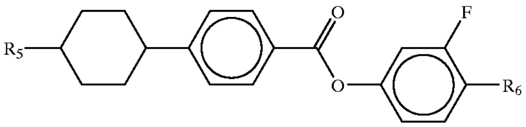
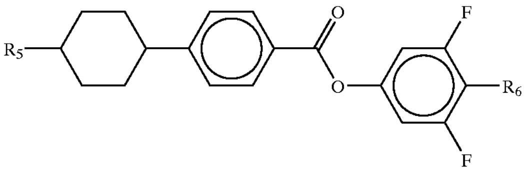
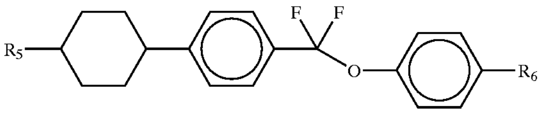
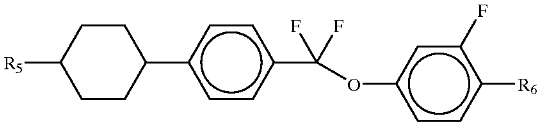
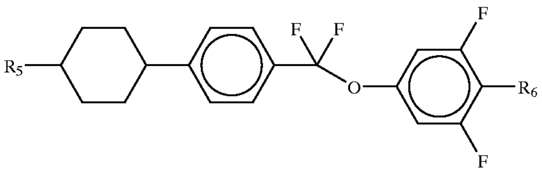
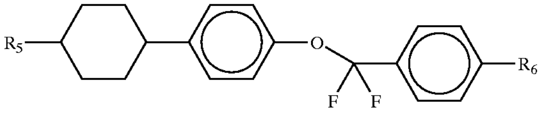
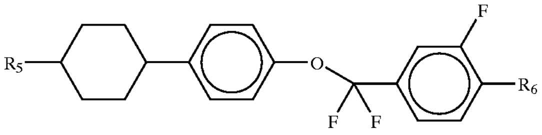
-continued
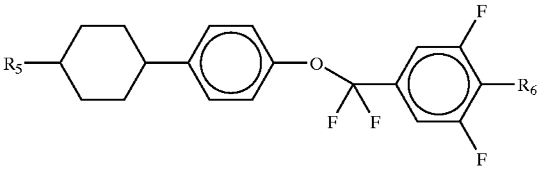
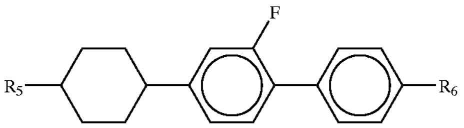
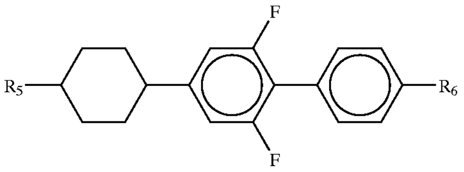
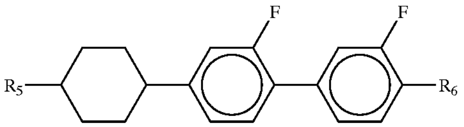
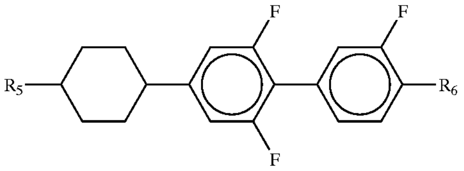
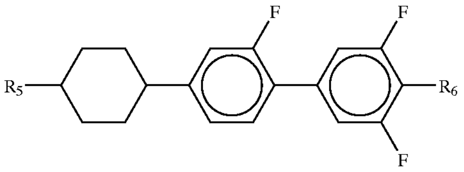
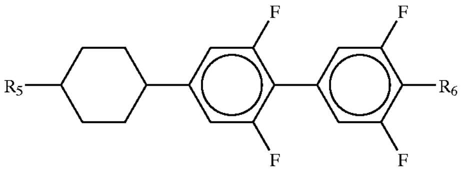
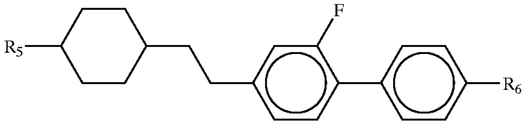
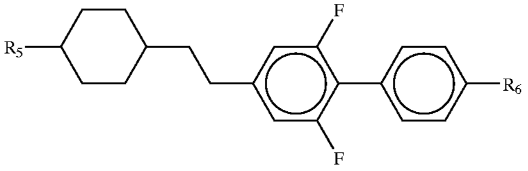
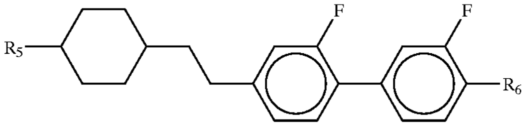
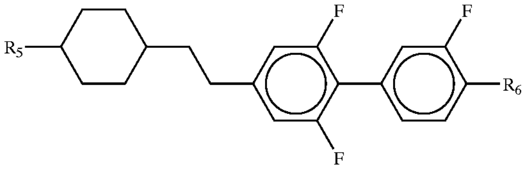

-continued
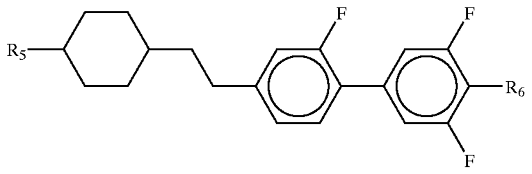
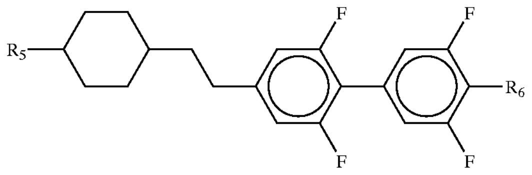
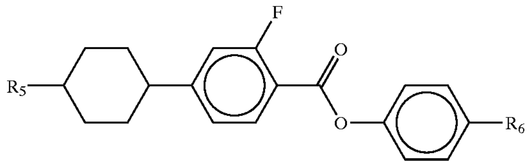
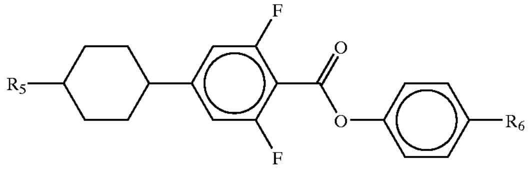
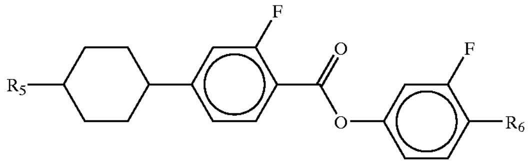
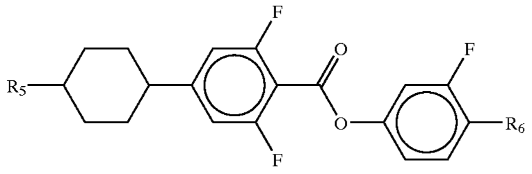
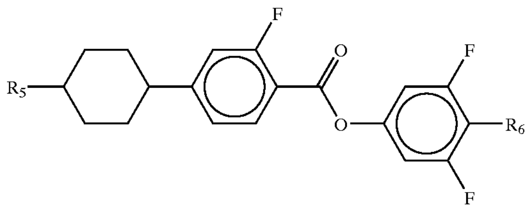
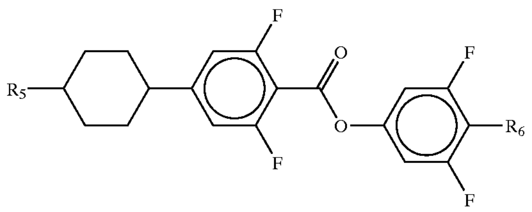
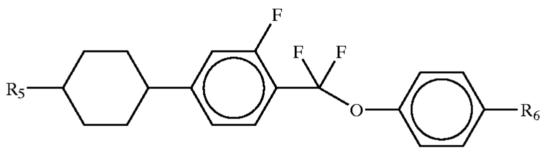
-continued
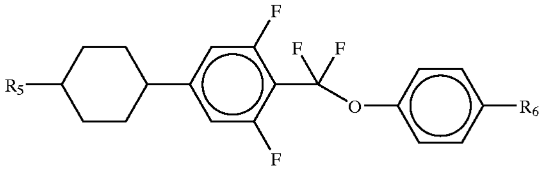
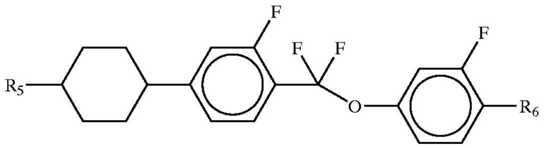
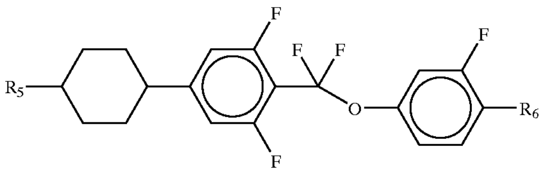
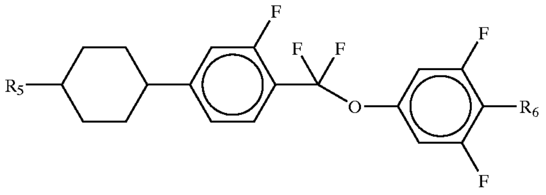
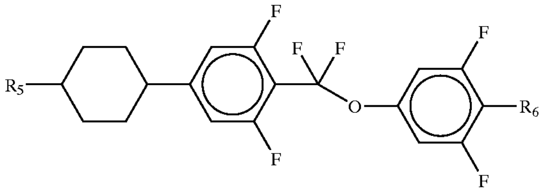
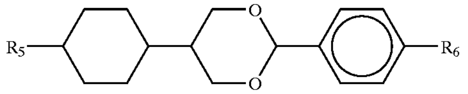
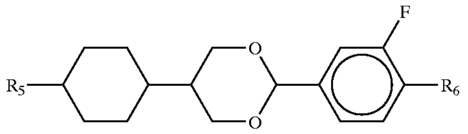
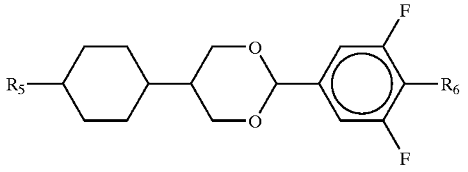
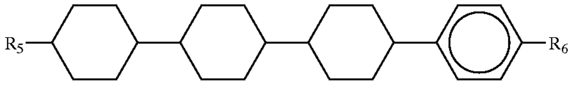
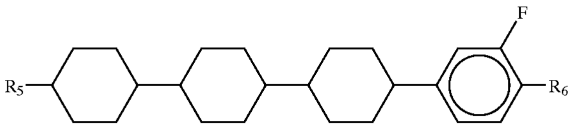
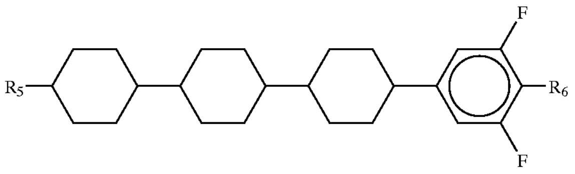

-continued

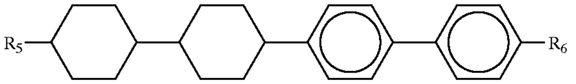
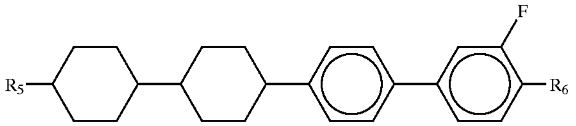
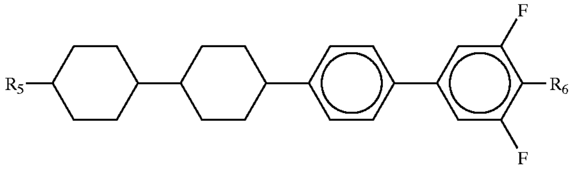
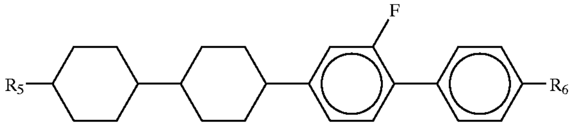
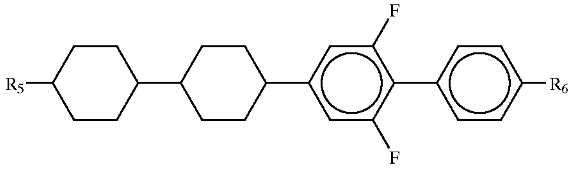
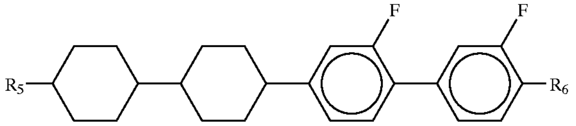
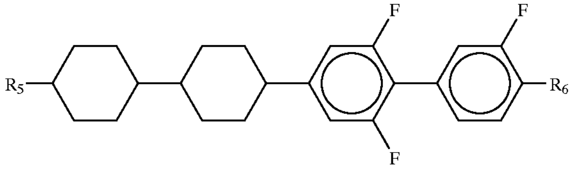
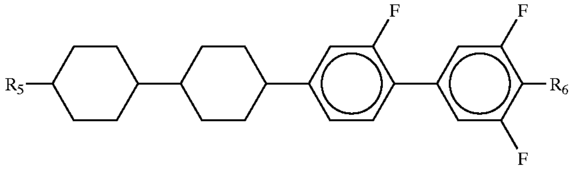
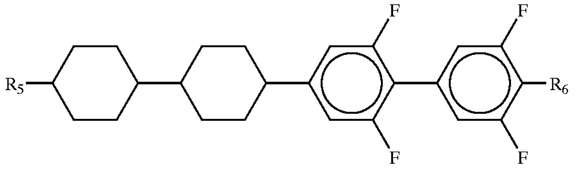
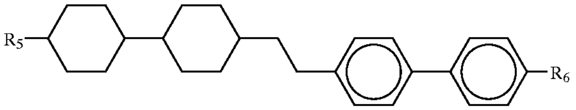
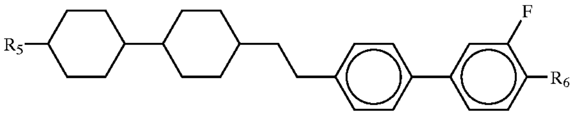
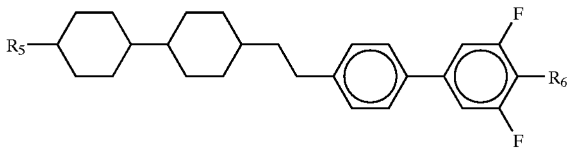

-continued

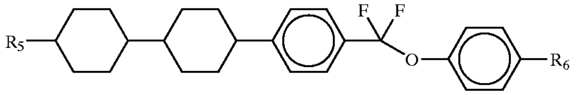
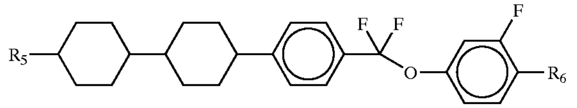
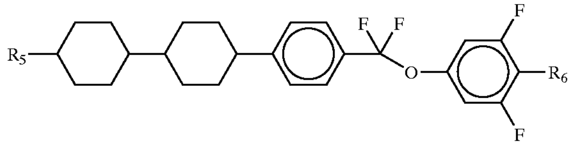
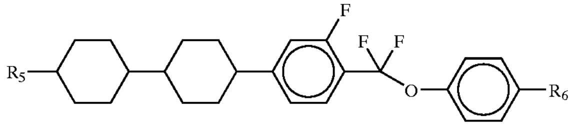
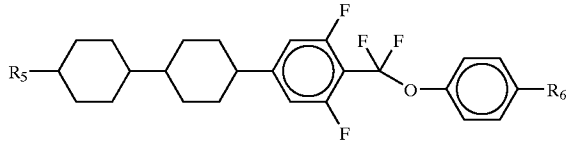
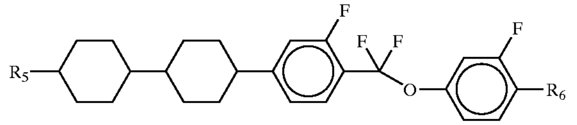
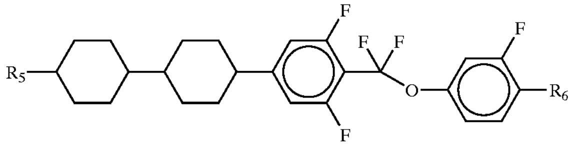
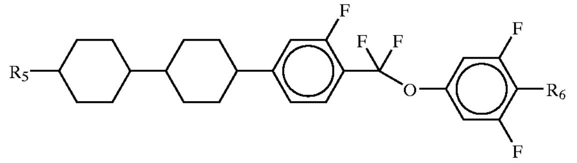
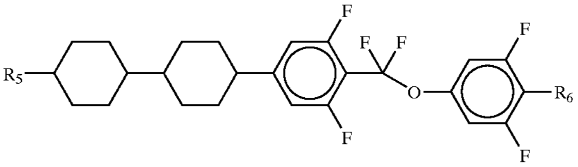

The examples also include liquid crystal compositions of at least one compound selected from those represented by general formulas (8) and (9).

Specific compounds are shown below; however, since not all the compounds represented by formulas (8) and (9) can be shown, only examples of these compounds are shown. Therefore, compounds not shown here but represented by formulas (8) and (9) fall within the scope of the present invention.

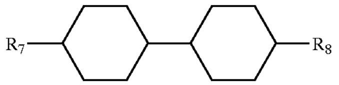
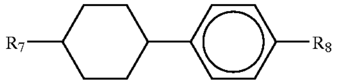

-continued
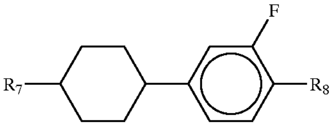
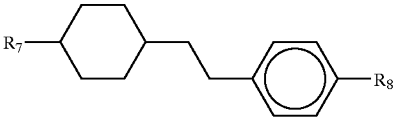
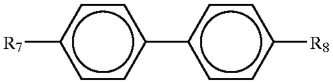
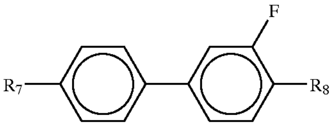
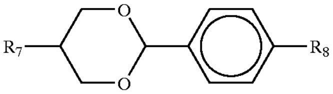
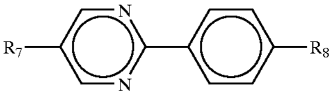
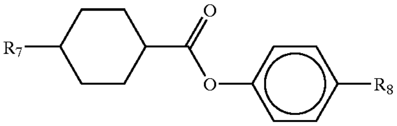
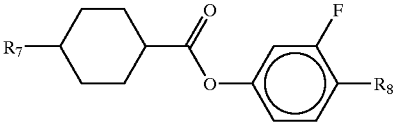
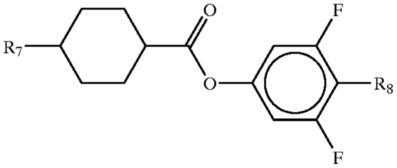
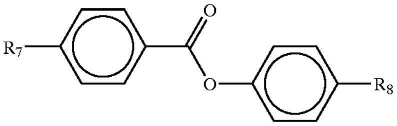
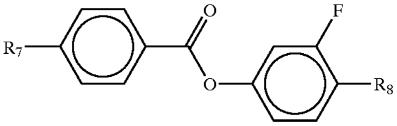
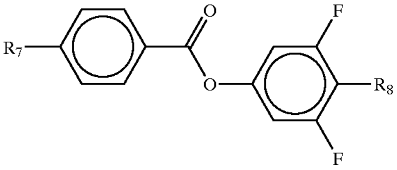
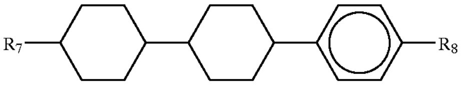
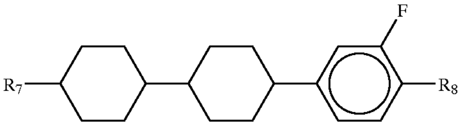
-continued
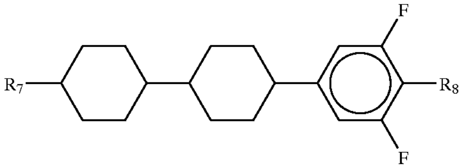
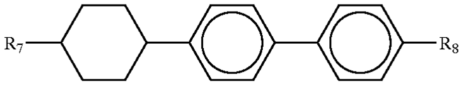
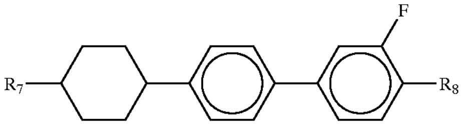
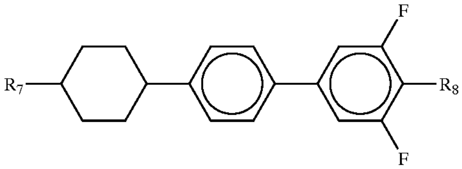
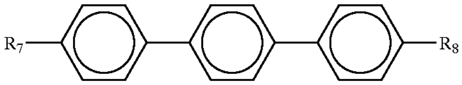
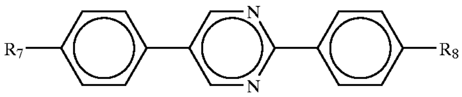
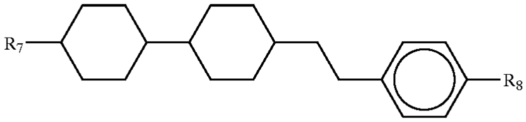
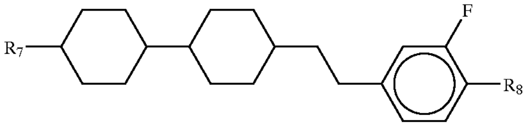
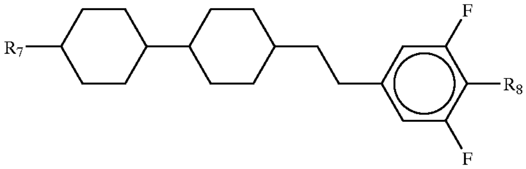
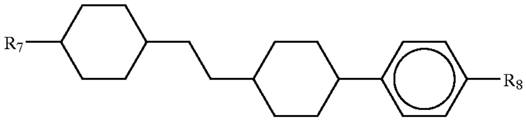
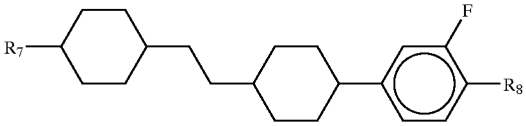
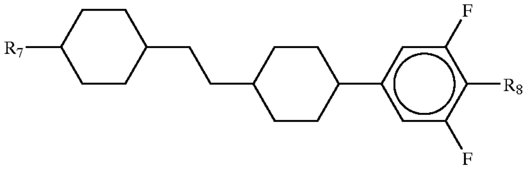
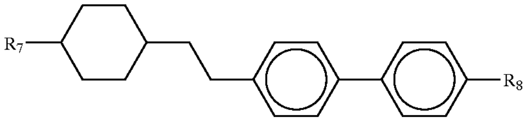

-continued

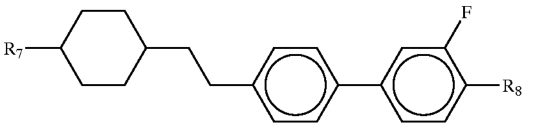

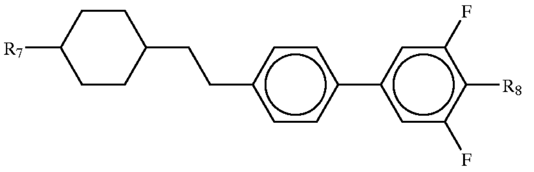

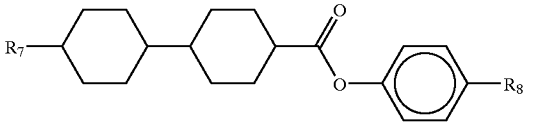

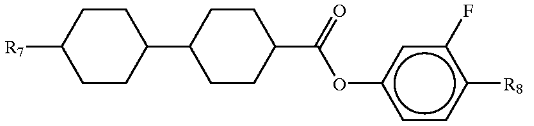

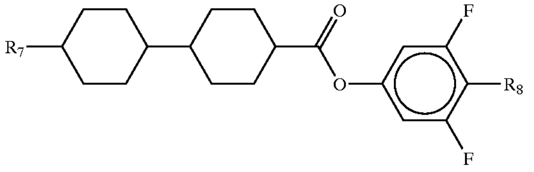

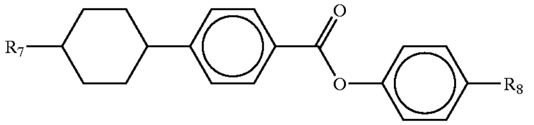

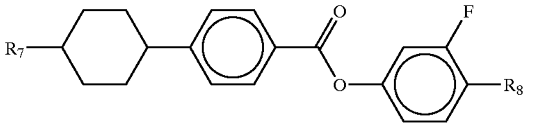

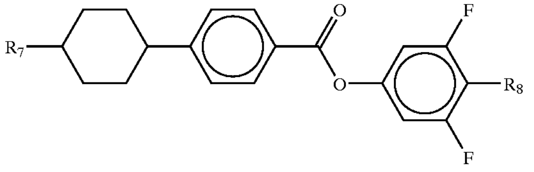

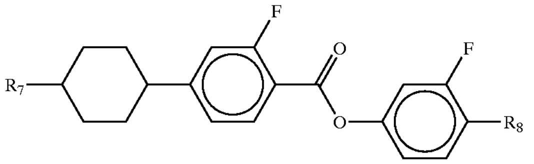

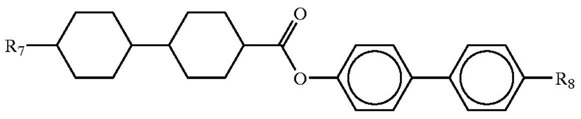

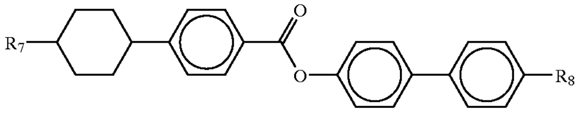

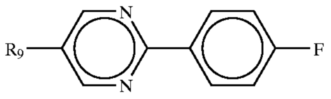

-continued

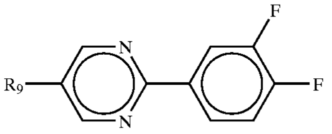

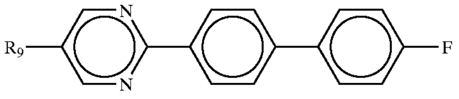

The examples also include liquid crystal compositions of at least one compound selected from those represented by general formulas (10), (11), and (12).

Specific compounds are shown below; however, since not all the compounds represented by formulas (10), (11), and (12) can be shown, only examples of these compounds are shown. Therefore, compounds not shown here but represented by formulas (10), (11), and (12) fall within the scope of the present invention.

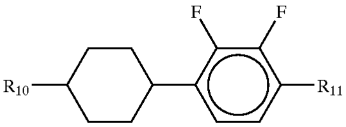

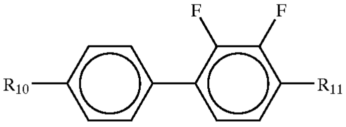

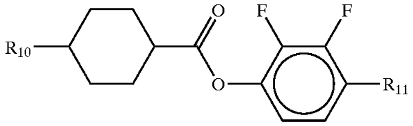

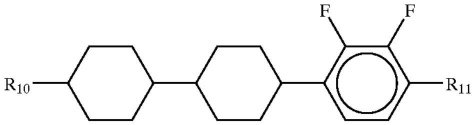

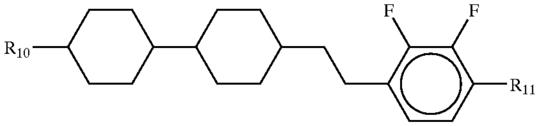

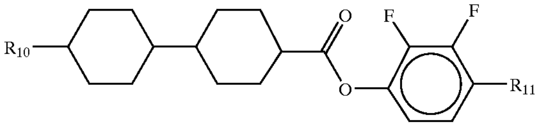

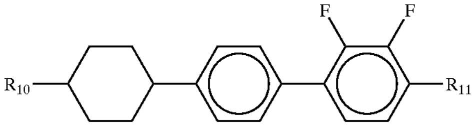

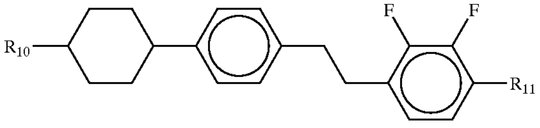

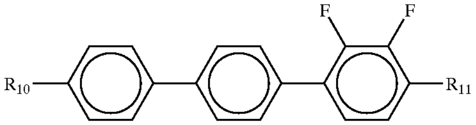

-continued

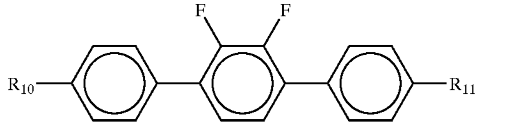

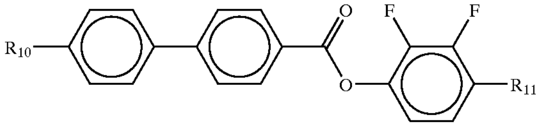

The examples also include liquid crystal compositions containing as the first component thereof at least one compound selected from those represented by the general formulas (5), (6), and (7) described above, and as the second component thereof at least one compound selected from those represented by the general formulas (13), (14), and (15).

Specific compounds are shown below; however, since not all the compounds represented by formulas (13), (14), and (15) can be shown, only examples of these compounds are shown. Therefore, compounds not shown here but represented by formulas (13), (14), and (15) fall within the scope of the present invention.

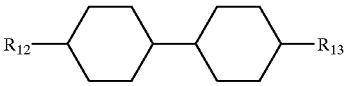

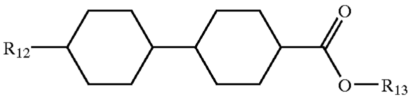

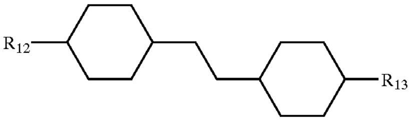

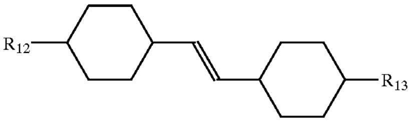

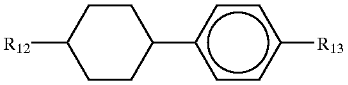

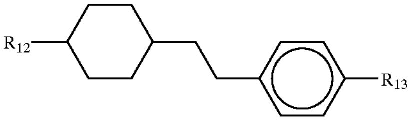

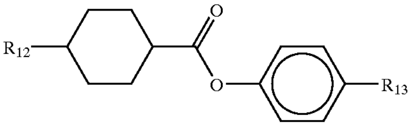

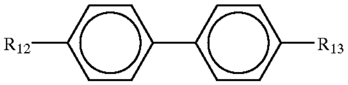

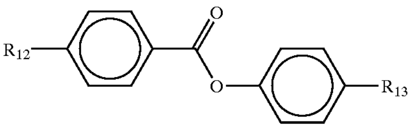

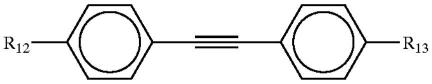

-continued

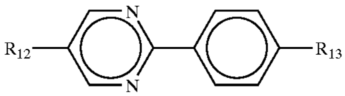

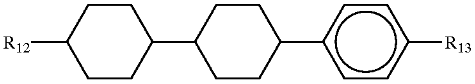

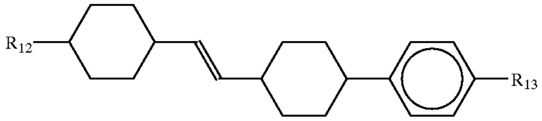

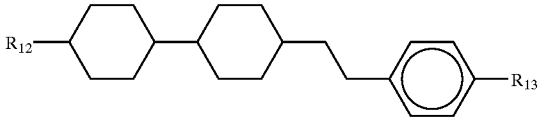

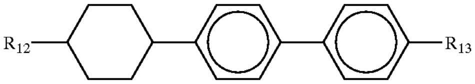

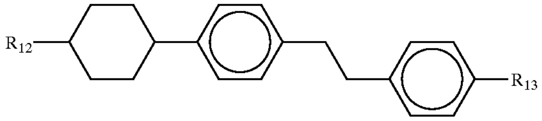

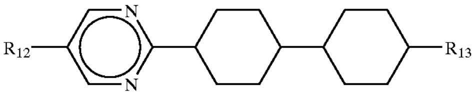

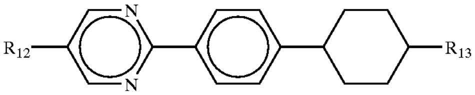

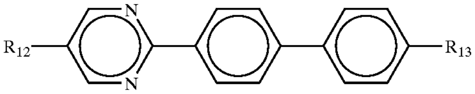

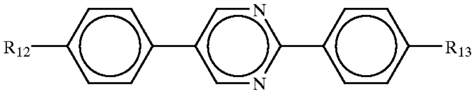

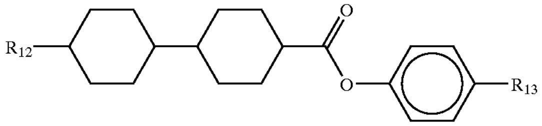

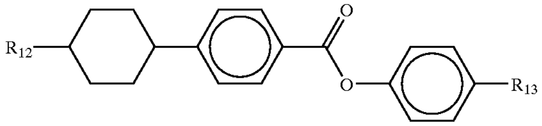

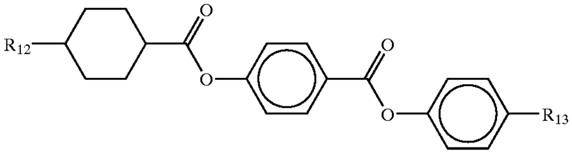

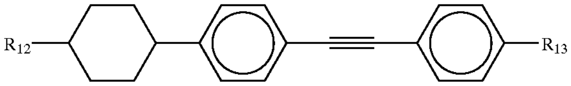

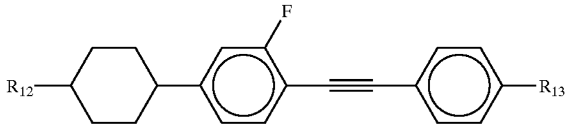

-continued

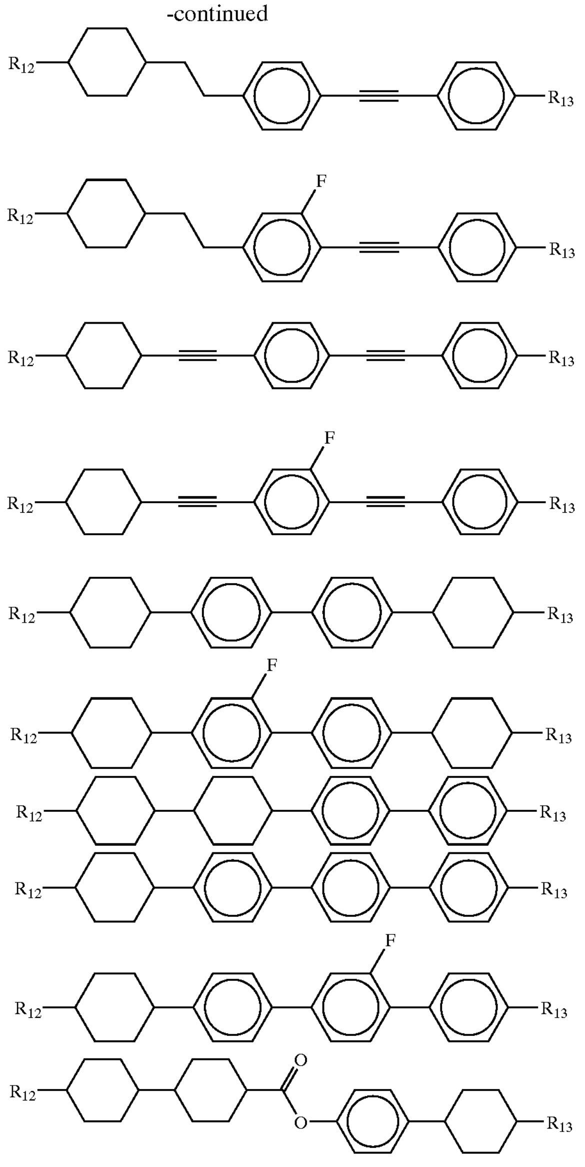

The examples also include liquid crystal compositions containing as the first component thereof at least one compound selected from those represented by the general formulas (8) and (9) described above, and as the second component at least one compound selected from those represented by the general formulas (13), (14), and (15).

The examples also include liquid crystal compositions containing as the first component thereof at least one compound selected from those represented by the general formulas (10), (11) and (12) described above, and as the second component thereof at least one compound selected from those represented by the general formulas (13), (14), and (15).

The examples also include liquid crystal compositions containing as the first component thereof at least one compound selected from those represented by the general formulas (5), (6), and (7) described above, as the second component at least one compound selected from those represented by the general formulas (8) and (9) described above, and as the third component at least one compound selected from those represented by the general formulas (13), (14), and (15) described above.

One or more optically active compound may be contained in the above liquid crystal composition without raising any problem.

EXAMPLES (Synthesis of Polyamic Acids A, B, and Copolyamic Acid C)

Before examples of the synthesis of various polyamic acids corresponding to the polyamic acids A, B, and copolyamic acid C are described, the names and abbreviations of tetracarboxylic dianhydrides, diamines, and solvents will be shown below. The abbreviations will be used in the following description.

(Tetracarboxylic Dianhydrides)

Pyromellitic dianhydride: PMDA

Cyclobutane tetracarboxylic dianhydride: CBDA

Butane tetracarboxylic dianhydride: BDA (Diamines)

4,4'-diaminodiphenylmethane: DPM 4,4'-diaminodiphenylethane: DPEt 4,4'-diaminodiphenylether: DPEr 1,3-bis-[4-((aminophenyl)methyl)phenyl]propane: DPMPP Bis[(4,4'-diaminophenoxy)phenyl]propane: DPPP 1,1-bis[4-(4-aminophenyl)methyl]phenyl-]-4-n-butylcyclohexane: PMBCh 1,1-bis(4-aminophenoxy)phenyl-4-(4-pentylcyclohexyl) cyclohexane: PPPCC

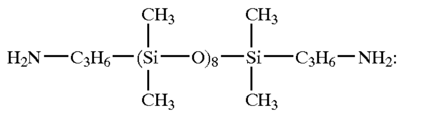

(Solvent Components)

N-methyl-2-pyrrolidone: NMP

Butyl cellosolve: BC (Synthesis of Polyamic Acid A1)

In a 200-ml four-neck flask having a inlet for inserting a thermometer, a inlet for inserting a stirrer, a inlet for feeding the materials, and a inlet for introducing nitrogen gas, 3.0087 g of DPM was dissolved in 44.00 g of dehydrated NMP with stirring under a stream of dry nitrogen gas. While the temperature of the reaction system was maintained at 5 to 70° C., 1.5033 g of BDA and 1.4880 g of CBDA were added successively, reaction was allowed to proceed for 5 to 30 hours, then 50.00 g of BC was added to obtain the polyamic acid A1 having a polymer content of 6% by weight. When the temperature was elevated due to the heat of reaction of the materials, the reaction temperature was lowered to 70° C. or below and the reaction was continued. In the embodiment of the present invention, the viscosity of the polyamic acid was checked during reaction, and when the viscosity after the addition of BC rose to 55 to 65 mPa·s (E-type viscometer, at 25° C.), the reaction was stopped, and the resultant polyamic acid A1 was stored at low temperature.

(Synthesis of Various Polyamic Acid A Components, Various Polyamic Acid B Components, and Copolyamic Acid C Components)

Polyamic acids A2 to A10, B1 to B13, and copolyamic acids C1 and C2 were synthesized in the same manner as for the polyamic acid A1. That is, the initial polyamic acid was synthesized by use of NMP alone, then BC was added to adjust the final polyamic acid content to 6% by weight.

The mole percentage of each material is shown in Table 1.

TABLE 1

Mole ratios of materials for Examples

| Synthetic | Tetracarboxylic dianhydride | | | Diamine compound | | | | | | | |
|---|---|---|---|---|---|---|---|---|---|---|---|
| Example | PMDA | CBDA | BDA | DPM | DPEt | DPEr | DPMPP | DPPP | PPPCC | PMBCh | FM3307 |
| A1 | | 25 | 25 | 50 | | | | | | | |
| A2 | | 35 | 15 | 50 | | | | | | | |
| A3 | | 15 | 35 | 50 | | | | | | | |
| A4 | | 50 | | 50 | | | | | | | |
| A5 | | | 50 | 50 | | | | | | | |
| A6 | | 25 | 25 | | 50 | | | | | | |
| A7 | 50 | | | 50 | | | | | | | |
| A8 | 25 | 25 | | 50 | | | | | | | |
| A9 | 25 | | 25 | 50 | | | | | | | |
| A10 | | 25 | 25 | | | 50 | | | | | |
| B1 | 50 | | | 32.5 | | | | | 17.5 | | |
| B2 | 50 | | | | | | | | 50 | | |
| B3 | 50 | | | | | | | 32.5 | 17.5 | | |
| B4 | 50 | | | 25 | | | | | 25 | | |
| B5 | 50 | | | | 32.5 | | | | 17.5 | | |
| B6 | 50 | | | | | | 32.5 | | 17.5 | | |
| B7 | 50 | | | | 25 | | | | | 25 | |
| B8 | 25 | 25 | | 32.5 | | | | | 17.5 | | |
| B9 | 50 | | | | | 32.5 | | | 17.5 | | |
| B10 | 50 | | | | | | | | 25 | | 25 |
| B11 | | 50 | | 32.5 | | | | | 17.5 | | |
| B12 | | | 50 | 32.5 | | | | | 17.5 | | |
| B13 | 20 | 30 | | 32.5 | | | | | 17.5 | | |
| C1 | 20 | 15 | 15 | 32.5 | | | | | 17.5 | | |
| C2 | 10 | 20 | 20 | 46.5 | | | | | 3.5 | | |

Examples 1–5 and Comparative Examples 1–4

The Examples were prepared from the polyamic acid A1 and the polyamic acid B1 formulated in various ratios. The Comparative Examples were prepared from the polyamic acid A1 alone, the polyamic acid B1 alone, and copolyamic acids C1 and C2 alone. The results of examination of pre-tilt angles and electrical properties are shown.

The polyamic acids having excellent electrical properties in the present invention mean polyamic acids of a small current consumption and high reliability of current consumption for a long time, and specifically, polyamic acids of which current consumption is 1.8 μA or less, and for which increase ratio in current consumption after a 120-hour constant temperature heating test performed at 110° C. is 1.4 times or less as determined in the testing method described in the Examples of the present invention.

1) Preparation of Varnish

The polyamic acid A1 and the polyamic acid B1 were mixed in the ratios shown in Table 2, and each mixture was diluted with a mixed solvent of NMP and BC (1:1) so that the total polymer content became 3% by weight to form varnish for application. In the Comparative Examples, varnish was prepared in the same manner except that each polyamic acid was used alone.

2) Preparation of Cells for Measuring Pre-Tilt Angles

By use of a spinner, the varnish for application was applied onto a glass substrate having a transparent ITO electrode. The substrate was preliminarily baked at 80° C. for about 5 minutes, then heat-treated at 200° C. for 30 minutes so as to convert the polyamic acid into a polyimide. Next, the surface of the substrate on which an aligning film had been formed was rubbed with a rubbing apparatus for alignment treatment, and after cleaning in ethanol for 5 minutes by use of an ultrasonic cleaner, the surface was rinsed with a fluorochlorocarbon and flowing water, and dried in an oven at 120° C. for 30 minutes. A gap material for forming a 20 μm gap was spread on the substrates, the substrates were assembled with their surfaces on which aligning films had been formed facing in, and the periphery of each substrate was sealed with an epoxy resin to form an anti-parallel cell having a 20 μm gap. A liquid crystal composition was injected into the cell, and the injection hole was sealed with a photo-curing adhesive. Next, the cell was subjected to heat treatment at 110° C. for 30 minutes to form a cell for measuring the pre-tilt angle.

The constituents of the liquid crystal compositions used as the material for liquid crystals are shown below. The composition had an NI point of 88.3° C., an anisotropy of refractive index of 0.151, and a threshold voltage of 1.35 V.

10%

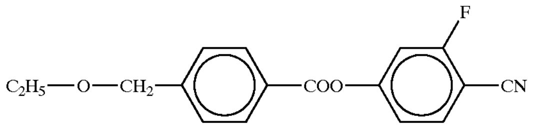

10%

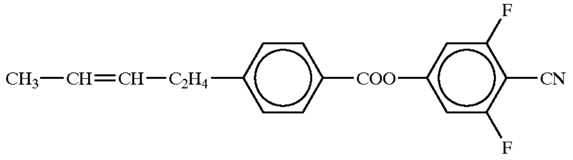

5%

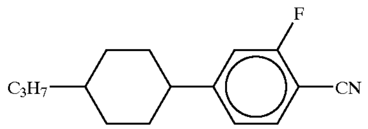

8%

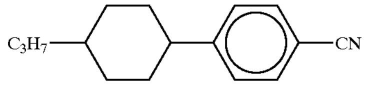

-continued

7%

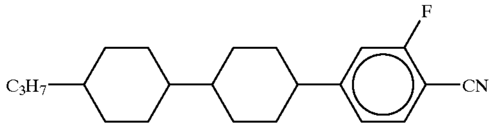

10%

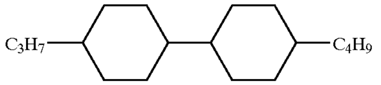

5%

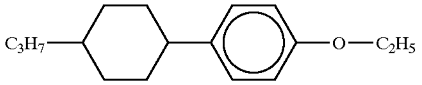

10%

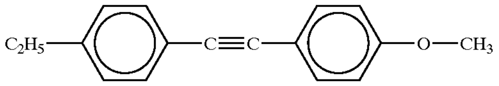

10%

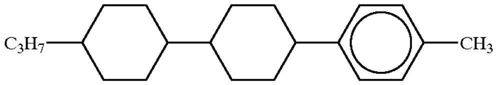

3) Measurement of Pre-Tilt Angles

The pre-tilt angles of liquid crystals were measured by the crystal rotation method normally used.

4) Preparation of Cells for Evaluating Electrical Properties

Cells for evaluating electrical properties were prepared in the same manner as in cells for measuring pre-tilt angles except that a gap material for forming a 7 μm gap was used. The liquid crystal material for evaluating electrical properties was also the same as the material for measuring pre-tilt angles.

5) Evaluation of Current Consumption

Current consumption was measured by impressing rectangular waves of 10 V, 32 Hz. The electrode area of the cell was 1 $cm^2$. First, the initial value of current consumption was measured, and then current consumption after constant temperature heating at 110° C. for 120 hours was measured. The value of current consumption after the heating test for 120 hours divided by the initial value was obtained as the aged/initial ratio.

The results of pre-tilt angles, and the initial values and the aged/initial ratios of current consumption are shown in Table 2.

TABLE 2

Pre-tilt angles and electrical properties of various polyamic acids

| | Polyamic acid | Mole ratio of materials for polymer component (mole %) | Pre-tilt angle (degrees) | Current consumption Initial (μA) | Current consumption Aged/initial ratio |
|---|---|---|---|---|---|
| Example 1 | B1/A1 = 5/95 | A1: CBDA/BDA/DPM = 25/25/50 | 7.0 | 1.63 | 1.22 |
| Example 2 | B1/A1 = 10/90 | B1: PMDA/DPM/PPPCC = 50/32.5/17.5 | 7.8 | 1.60 | 1.21 |
| Example 3 | B1/A1 = 20/80 | | 8.3 | 1.62 | 1.24 |
| Example 4 | B1/A1 = 30/70 | | 8.3 | 1.68 | 1.29 |
| Example 5 | B1/A1 = 50/50 | | 8.3 | 1.70 | 1.31 |
| Comp. Ex. 1 | A1 | CBDA/BDA/DPM = 25/25/50 | 1.1 | 1.65 | 1.22 |
| Comp. Ex. 2 | B1 | PMDA/DPM/PPPCC = 50/32.5/17.5 | 8.3 | 1.99 | 2.14 |
| Comp. Ex. 3 | C1 | PMDA/CBDA/BDA/DPM/PPPCC = 20/15/15/32.5/17.5 | 3.1* | — | — |
| Comp. Ex. 4 | C2 | PMDA/CBDA/BDA/DPM/PPPCC = 10/20/20/46.5/3.5 | 0.8* | — | — |

*Poor alignment occurred.

-continued

10%

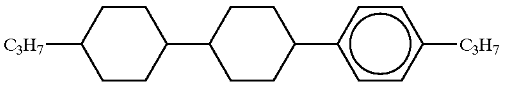

8%

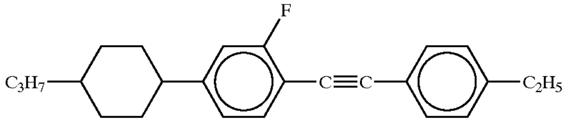

7%

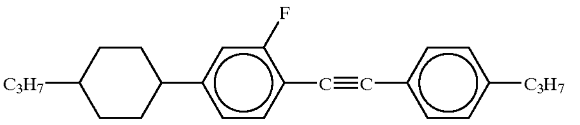

The results of Examples 1 to 5 show that liquid crystal alignment materials simultaneously having adequate pre-tilt angles and preferred initial values and aged/initial ratios of current consumption were obtained by mixing the polyamic acid A1 that excels in terms of initial values and aged/initial ratios of current consumption but increases pre-tilt angles of liquid crystals little (see Comparative Example 1) with the polyamic acid B1 that has poorer electrical properties but is able to appreciably increase the pre-tilt angles of liquid crystals (see Comparative Example 2).

From the initial values of current consumption of Examples 1 to 5, it is known that minimum values are observed in the vicinity of about 10% by weight of the polyamic acid B1, and that the initial values are almost the same as those of polyamic acid A1 up to the content of 50% by weight of the polyamic acid B1. Regarding pre-tilt angles, on the other hand, the values obtained in the vicinity of the 5% by weight content of polyamic acid B1 are almost the same as those obtained for 100% by weight content of polyamic acid B1.

These results are collectively shown in FIG. 1. From FIG. 1 it is understood that the pre-tilt angle, the initial value of current consumption, and the aged/initial ratio are well balanced when the content of polyamic acid B1 falls within the range of 5% to 50% by weight. That is, when the electrical properties and the pre-tilt angles of this composition system are considered, it is known that the optimal composition is one in which the content of polyamic acid B1 is around 10% by weight.

Comparative Examples 3 and 4 were prepared for examining copolyamic acids synthesized by use of the same materials instead of the mixed systems of the Examples. While Examples 1 to 5 of the mixed systems exhibit high pre-tilt angles of 7.0 to 8.3°, Comparative Examples 3 and 4 of copolyamic acid systems exhibit lower pre-tilt angles, and poor alignment as well, indicating that satisfactory results could not be obtained from copolyamic acid systems.

Examples 6–10 and Comparative Examples 5–8

For these Examples and Comparative Examples, there are shown the results of examination on pre-tilt angles and electrical properties when the polyamic acid B is fixed to the polyamic acid B1 and various polyamic acids A are combined with the polyamic acid B1.

1) Preparation of Varnish

Polyamic acids A2 to A10 and the polyamic acid B1 were mixed in the ratio of the polyamic acids A to the polyamic acid B1 of 90%:10% by weight, and each mixture was diluted with a mixed solvent of NMP and BC (1:1) so that the total polymer content became 3% by weight to form varnish for application.

2) Preparation of Cells for Measuring Pre-Tilt Angles and the Measurement of Pre-Tilt Angles Cells for measuring pre-tilt angles were prepared and pre-tilt angles were measured in the same manner as in Example 1.

3) Preparation of Cells for Evaluating Electrical Properties and the Evaluation of Current Consumption Cells for evaluating electrical properties were prepared and their initial values of current consumption and aged/initial ratios were measured in the same manner as in Example 1.

Table 3 shows the results of Examples 6–10 and Comparative Examples 5–8.

The results of Examples 6–9 and Comparative Examples 5–7 show that CBDA or BDA is more preferable than PMDA as the tetracarboxylic dianhydride component used in the polyamic acid A, and further, the combination of CBDA and BDA provides a larger pre-tilt angle and better electrical properties than does CBDA alone or BDA alone.

Also, the results of Examples 2 and 10 and Comparative Example 8 show that the amine components having alkyl groups, such as DPM and DPEt, are more preferable in terms of electrical properties than are the amine components having ether groups, such as DPEr.

Examples 11–17 and Comparative Examples 9–13

For these Examples and Comparative Examples, there are shown the results of examinations of pre-tilt angles and electrical properties when the polyamic acid A is fixed to the polyamic acid A1 and various polyamic acids B are combined with the polyamic acid A1.

1) Preparation of Varnish

Polyamic acids A1 and the polyamic acid B2 to B13 were mixed in the ratio of the polyamic acid A1 to various polyamic acids B of 90%:10% by weight, and each mixture was diluted with a mixed solvent of NMP and BC (1:1) so that the total polymer content became 3% by weight to form varnish for application.

2) Preparation of Cells for Measuring Pre-Tilt Angles and the Measurement of Pre-Tilt Angles Cells for measuring pre-tilt angles were prepared and pre-tilt angles were measured in the same manner as in Example 1.

3) Preparation of Cells for Evaluating Electrical Properties and the Evaluation of Current Consumption Cells for evaluating electrical properties were prepared and their initial values of current consumption and aged/initial ratios were measured in the same manner as in Example 1.

Table 4 shows the results of Examples 11–17 and Comparative Examples 9–13.

TABLE 3

Pre-tilt angles and electrical properties of various polyamic acids

| | Polyamic acid | Mole ratio of materials for polymer component (mole %) | Pre-tilt angle (degrees) | Current consumption Initial (μA) | Current consumption Aged/initial ratio |
|---|---|---|---|---|---|
| Example 6 | B1/A2 = 10/90 | A2: CBDA/BDA/DPM = 35/15/50 | 7.9 | 1.61 | 1.22 |
| Example 7 | B1/A3 = 10/90 | A3: CBDA/BDA/DPM = 15/35/50 | 7.9 | 1.60 | 1.21 |
| Example 8 | B1/A4 = 10/90 | A4: CBDA/DPM = 50/50 | 7.4 | 1.72 | 1.34 |
| Example 9 | B1/A5 = 10/90 | A5: BDA/DPM = 50/50 | 7.4 | 1.71 | 1.32 |
| Example 10 | B1/A6 = 10/90 | A6: CBDA/BDA/DPEt = 25/25/50 | 7.7 | 1.62 | 1.25 |
| Comp. Ex. 5 | B1/A7 = 10/90 | A7: PMDA/DPM = 50/50 | 7.1 | 2.02 | 2.22 |
| Comp. Ex. 6 | B1/A8 = 10/90 | A8: PMDA/CBDA/DPM = 25/25/50 | 7.3 | 1.86 | 1.77 |
| Comp. Ex. 7 | B1/A9 = 10/90 | A9: PMDA/BDA/DPM = 25/25/50 | 7.2 | 1.92 | 1.87 |
| Comp. Ex. 8 | B1/A10 = 10/90 | A10: CBDA/BDA/DPEr = 25/25/50 | 7.2 | 2.04 | 2.25 |

Note: The component B is entirely B1. (B1: PMDA/DPM/PPPCC = 50/32.5/17.5)

TABLE 4

Pre-tilt angles and electrical properties of various polyamic acids

| | Polyamic acid | Mole ratio of materials for polymer component (mole %) | Pre-tilt angle (degrees) | Current consumption Initial (μA) | Current consumption Aged/initial ratio |
|---|---|---|---|---|---|
| Example 11 | B2/A1 = 10/90 | B2: PMDA/PPPCC = 50/50 | 9.8 | 1.68 | 1.33 |
| Example 12 | B3/A1 = 10/90 | B3: PMDA/DPPP/PPPCC = 50/32.5/17.5 | 3.7 | 1.66 | 1.18 |
| Example 13 | B4/A1 = 10/90 | B4: PMDA/DPM/PPPCC = 50/25/25 | 9.2 | 1.67 | 1.35 |
| Example 14 | B5/A1 = 10/90 | B5: PMDA/DPEt/PPPCC = 50/32.5/17.5 | 9.1 | 1.60 | 1.18 |
| Example 15 | B6/A1 = 10/90 | B6: PMDA/DPMPP/PPPCC = 50/32.5/17.5 | 4.5 | 1.62 | 1.22 |
| Example 16 | B7/A1 = 10/90 | B7: PMDA/DPEt/PMBCh = 50/25/25 | 4.3 | 1.73 | 1.33 |
| Example 17 | B8/A1 = 10/90 | B8: PMDA/CBDA/DPM/PPPCC = 25/25/32.5/17.5 | 6.0 | 1.74 | 1.35 |
| Comp. Ex. 9 | B9/A1 = 10/90 | B9: PMDA/DPEr/PPPCC = 50/32.5/17.5 | 7.3 | 1.96 | 1.99 |
| Comp. Ex. 10 | B10/A1 = 10/90 | B10: PMDA/FM3307/PPPCC = 50/25/25 | 0.7* | — | — |
| Comp. Ex. 11 | B11/A1 = 10/90 | B11: CBDA/DPM/PPPCC = 50/32.5/17.5 | 12.7* | — | — |
| Comp. Ex. 12 | B12/A1 = 10/90 | B12: BDA/DPM/PPPCC = 50/32.5/17.5 | 12.5* | — | — |
| Comp. Ex. 13 | B13/A1 = 10/90 | B13: PMDA/CBDA/DPM/PPPCC = 20/30/32.5/17.5 | 3.2* | 1.88 | 1.30 |

Note: The component A is entirely A1. (A1: CBDA/BDA/DPM = 25/25/50)
*Poor alignment occurred.

The results of Examples 11–16 show that the use, as the amine components used in the polyamic acid B, of amine components having on their side chains groups that increase the pre-tilt angle of liquid crystals, such as PPPCC, DPPP, and PMBCH, alone, or the combination of such amine components with DPM, DPEt or DPMPP, is especially preferred in terms of electrical properties. From Comparative Examples 9 and 10 it is seen that, since a diamine of a two-ring structure having an ether group (DDEr) is not preferred in terms of electrical properties, and since a siloxane-based diamine (FM3307) provides a small pre-tilt angle and the poor alignment of liquid crystal molecules, these are not suited for aligning films for liquid crystal display elements.

The results of Example 17 and Comparative Examples 11 to 13 show that tetracarboxylic dianhydride components used in the polyamic acid B containing 50 mole % or more aromatic components such as PMDA are preferred from the viewpoint of the alignment of liquid crystal molecules.

Examples 18–22

For these Examples, there are shown the results of examination of the aligning film manufacturing process dependence (Preliminary baking temperature dependence) of pre-tilt angles when the ratios of polyamic acids A1 to B1 are changed.

1) Preparation of Varnish

The polyamic acid A1 and the polyamic acid B1 were mixed in the ratios shown in Table 5, and each mixture was diluted with a mixed solvent of NMP and BC (1:1) so that the total polymer content became 3% by weight to form varnish for application.

2) Preparation of Cells for Measuring Pre-Tilt Angles and the Measurement of Pre-Tilt Angles Cells for measuring pre-tilt angles were prepared and pre-tilt angles were measured in the same manner as in Example 1 except that the temperature of preliminary baking was changed.

Table 5 shows the results of Examples 18 to 22.

TABLE 5

Dependence of pre-tilt angle by preliminary baking temperature and content of polyamic acid B1

| | Polyamic acid | Pre-tilt angle (degrees) Preliminary sintering temperature (° C.) 60 | 80 | 100 | Change in pre-tilt angle 100° C./60° C. |
|---|---|---|---|---|---|
| Comp. Ex. 18 | B1/A1 = 5/95 | 7.6 | 7.0 | 6.3 | 0.83 |
| Comp. Ex. 19 | B1/A1 = 10/90 | 8.2 | 7.8 | 7.4 | 0.90 |
| Comp. Ex. 20 | B1/A1 = 20/80 | 8.3 | 8.3 | 8.1 | 0.98 |
| Comp. Ex. 21 | B1/A1 = 30/70 | 8.3 | 8.3 | 8.3 | 1.00 |
| Comp. Ex. 22 | B1/A1 = 50/50 | 8.3 | 8.3 | 8.3 | 1.00 |

Note: Components A and B are A1 and B1, respectively. (A1: CBDA/BDA/DPM = 25/25/50, B1: PMDA/DPM/PPPCC = 50/32.5/17.5)

From the above results, it is known that if the content of the polyamic acid B in the polyamic acid component is small, pre-tilt angle exhibits dependence on the temperature of preliminary baking. Although the higher content of the polyamic acid B provides smaller dependence on the temperature of preliminary baking, the preferable content of the polyamic acid B is 50% by weight at highest, because the high content of the polyamic acid B affects the electrical properties, as described above. The lower limit of the content depends on the combination of the polyamic acid A and the polyamic acid B, but the content of the polyamic acid B of less than 5% by weight is not preferable, because the dependence on the temperature of preliminary baking increases.

INDUSTRIAL APPLICABILITY

From a liquid crystal alignment material produced by mixing the polyamic acid a and the polyamic acid b of the present invention, there can be obtained an excellent liquid crystal display element which has an adequate pre-tilt angle, a small residual voltage, and an excellent initial value and aged/initial ratio of current consumption, as well as a low process dependence.

What is claimed is:

1. A polyamic acid composition comprising a polyamic acid A providing a polyamide having excellent electrical properties, and a polyamic acid B comprising a diamine having side chains, wherein said polyamic acid A is a polyamic acid comprising an acid component containing aliphatic tetracarboxylic dianhydride, or an acid component containing aliphatic tetracarboxylic dianhydride and alicyclic tetracarboxylic dianhydride, and an amine component based on at least one of armoatic diamine represented by the following formula (1);

(1)

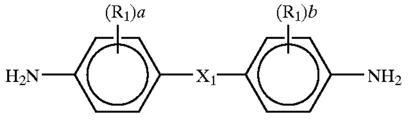

wherein, $X_1$ is a divalent aliphatic group; each $R_1$ is independently hydrogen atom or $CH_3$; and a and b are 1 to 2, and said polyamic acid B is a polyamic acid comprising an acid component containing 50 mole % or more aromatic tetracarboxylic dianhydride, and an amine component containing a diamine having a group enabling the pre-tilt angle of a liquid crystal to be increased on the side chain thereof, the ratio A/B of the polyamic acid A to the polyamic acid B being 50/50 to 95/5 (by weight).

2. A polyamic acid composition according to claim 1, wherein the diamine having a group enabling the pre-tilt angle of a liquid crystal to be increased in the polyamic acid B is at least one of diamines represented by general formulas (2) and (3), or said diamine and at least one of diamines represented by the above formula (1) and a general formula (4)

(2)

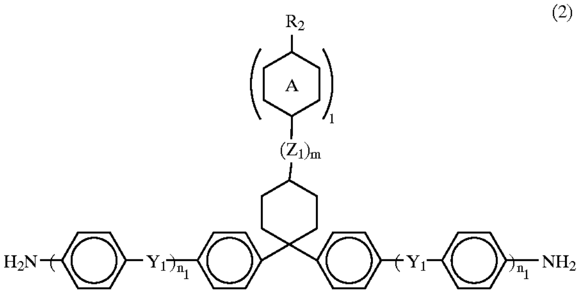

wherein, $R_2$ is hydrogen atom or an alkyl group having 1 to 12 carbon atoms; $Z_1$ is $CH_2$ group; m is an integer from 0 to 2; the ring A is benzene ring or cyclohexane ring; l is 0 or 1; each $Y_1$ is independently oxygen atom or $CH_2$ group; and each $n_1$ is independently 0 or 1

(3)

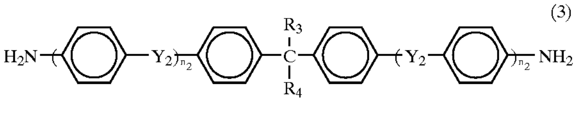

wherein, each $Y_2$ is independently oxygen atom or $CH_2$ group; each of $R_3$ and $R_4$ is independently hydrogen atom, an alkyl group or a perfluoroalkyl group having 1 to 12 carbon atoms, at least one of $R_3$ and $R_4$ being an alkyl group having 3 or 2 more carbon atoms; and each $n_2$ is independently 0 or 1

(4)

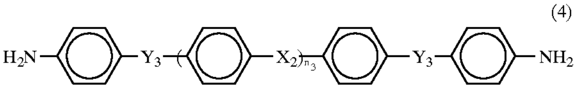

wherein, $Y_3$ is independently oxygen atom or $CH_2$ group; each $X_2$ is independently a single bond, oxygen atom, or a linear alkyl group having 1 to 6 carbon atoms; and $n_3$ is an integer from 0 to 2.

3. A polyamic acid composition according to claim 2, wherein the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2.

4. A polyamic acid composition according to claim 2, wherein the ratio of the aliphatic tetracarboxylic dianhydride to the alicyclic tetracarboxylic dianhydride in polyamic acid A is 90/10 to 30/70 (mole ratio); and the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2.

5. A polyamic acid composition according to claim 2, wherein the aliphatic tetracarboxylic dianhydride in the polyamic acid A is butane tetracarboxylic dianhydride, the alicyclic tetracarboxylic dianhydride in the polyamic acid A is cyclobutane tetracarboxylic dianhydride, the polyamic acid A contains a diamine component of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2, and the aromatic tetracarboxylic dianhydride in the polyamic acid B is pyromellitic dianhydride.

6. A polyamic acid composition according to claim 2, wherein the polyamic acid A comprises an acid component containing cyclobutane tetracarboxylic dianhydride and butane tetracarboxylic dianhydride, and an amine component containing a diamine of the general formula (1), wherein $X_1$ is $CH_2$, $CH_2CH_2$, $CH_2CH_2CH_2$, or $C(CH_3)_2$; each $R_1$ is independently hydrogen atom or $CH_3$; and each of a and b is 1 to 2, and the aromatic tetracarboxylic dianhydride in the polyamic acid B is pyromellitic dianhydride.

7. A polyamic acid composition according to claim 2, wherein the aliphatic tetracarboxylic dianhydride in the polyamic acid A is butane tetracarboxylic dianhydride, the alicyclic tetracarboxylic dianhydride in the polyamic acid A is cyclobutane-tetracarboxylic dianhydride, the ratio of the former to the latter is 90/10 to 30/70 (mole ratio) and in the general formula (1), $X_1$ is $CH_2$ or $CH_2CH_2$; each $R_1$ is hydrogen atom; and the aromatic tetracarboxylic dianhydride in the polyamic acid B is pyromellitic dianhydride.

8. An aligning film for liquid crystal display elements which comprises a liquid crystal composition containing a polyamide obtained from a composition according to claim 1.

9. A liquid crystal display element containing an aligning film for liquid crystal display elements according to claim 8.

10. A liquid crystal display element according to claim 9, wherein the liquid crystal composition contains at least one compound selected from those represented by general formulas (5), (6), and (7)

(5)

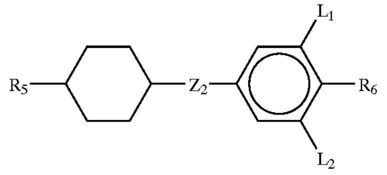

(6)

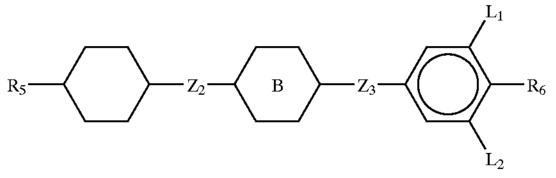

(7)

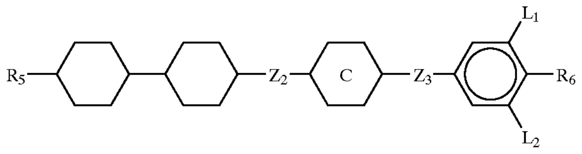

wherein, $R_5$ is an alkyl group having 1 to 10 carbon atoms in which optional, nonadjacent methylene groups may be substituted by —O— or —CH═CH—, and in which optional hydrogen atoms may be substituted by fluorine atoms; $R_6$ is fluorine atom, chlorine atom, $—OCF_3$, $—OCF_2H$, $—CF_3$, $—CF_2H$, $—CFH_2$, $—OCF_2CF_2H$ or $—OCF_2CFHCF_3$; each of $L_1$ and $L_2$ is independently hydrogen atom or fluorine atom; each of $Z_2$ and $Z_3$ is independently 1,2-ethylene, 1,4-butylene, —COO—, $—CF_2O—$, $—OCF_2—$, —CH═CH—, or a single bond; ring B is trans-1,4-cyclohexylene, 1,3-dioxane-2,5-diyl, or 1,4-phenylene in which hydrogen atoms may be substituted by fluorine atoms; and ring C is trans-1,4-cyclohexylene, or 1,4-phenylene in which hydrogen atoms may be substituted by fluorine atoms.

11. A liquid crystal display element according to claim 10, wherein the liquid crystal composition further contains one or more optically active compounds.

12. A liquid crystal display element according to claim 9, wherein the liquid crystal composition contains at least one compound selected from those represented by general formulas (10), (11), and (12)

(10)

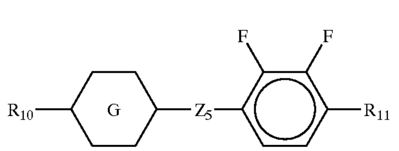

(11)

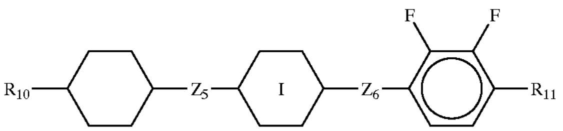

-continued (12)

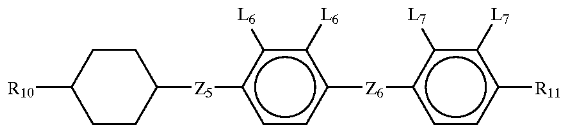

wherein, each of $R_{10}$ and $R_{11}$ is independently an alkyl group having 1 to 10 carbon atoms in which optional, nonadjacent methylene groups may be substituted by —O— or —CH═CH—, and in which optional hydrogen atoms may be substituted by fluorine atoms; each of rings G and I is independently trans-1,4-cyclohexylene or 1,4-phenylene; each of $L_6$ and $L_7$ is independently hydrogen atom or fluorine atom, but $L_6$ and $L_7$ are not hydrogen atoms simultaneously; and each of $Z_5$ and $Z_6$ is independently 1,2-ethylene, —COO—, or a single bond.

13. A liquid crystal display element according to claim 9, wherein the liquid crystal composition contains as the first component thereof at least one compound selected from those represented by general formulas (5), (6), and (7), and contains as the second component thereof at least one compound selected from those represented by general formulas (13), (14), and (15)

(5)

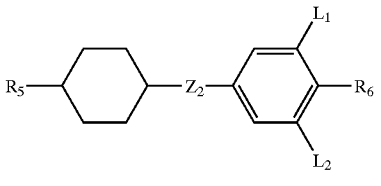

(6)

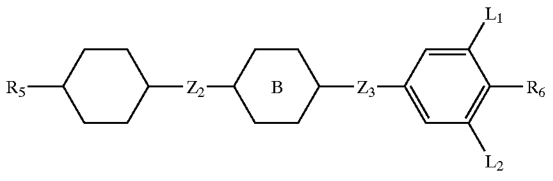

(7)

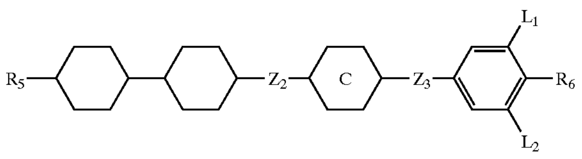

wherein, $R_5$ is an alkyl group having 1 to 10 carbon atoms in which optional, non-adjacent methylene groups may be substituted by —O— or —CH═CH—, and in which optional hydrogen atoms may be substituted by fluorine atoms; $R_6$ is fluorine atom, chlorine atom, $—OCF_3$, $—OCF_2H$, $—CF_3$, $—CF_2H$, $—CFH_2$, $—OCF_2CF_2H$ or $—OCF_2CFHCH_3$; each of $L_1$ and $L_2$ is independently a hydrogen atom or fluorine atom; each of $Z_2$ and $Z_3$ is independently 1,2-ethylene, 1,4-butylene, —COO—, $—CF_2O—$, $—OCF_2—$, —CH═CH—, or a single bond; ring B is trans-1,4-cyclohexylene, 1,3-dioxane-2,5-diyl, or 1,4-phenylene in which hydrogen atoms may be substituted by fluorine atoms; and ring C is trans-1,4-cyclohexylene, or 1,4-phenylene in which hydrogen atoms may be substituted by fluorine atoms;

(13)

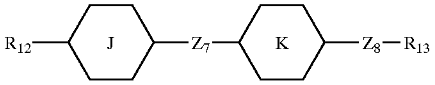

(14)

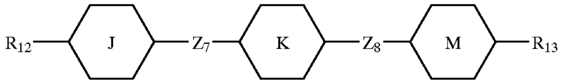

(15)

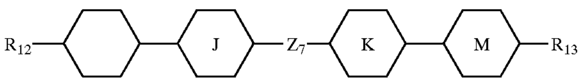

wherein, each of $R_{12}$ and $R_{13}$ is independently an alkyl group having 1 to 10 carbon atoms in which optional, nonadjacent methylene groups may be substituted by —O— or —CH═CH—, and in which optional hydrogen atoms may be substituted by fluorine atoms; each of rings J, K, and M is independently trans-1,4-cyclohexylene, pyrimidine-2,5-diyl, or 1,4-phenylene in which hydrogen atoms may be substituted by fluorine atoms; and each of $Z_7$ and $Z_8$ is independently 1,2-ethylene, —C≡C—, —COO—, —CH═CH—, or a single bond.

14. A liquid crystal display element according to claim 9, wherein the liquid crystal composition contains as the first component thereof at least one compound selected from those represented by general formulas (8), and (9), and contains as the second component thereof at least one compound selected from those represented by general formulas (13), (14), and (15)

(8)

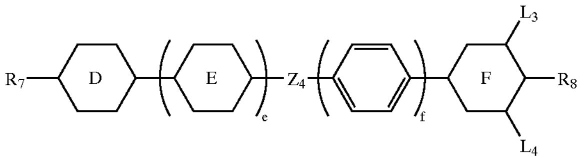

(9)

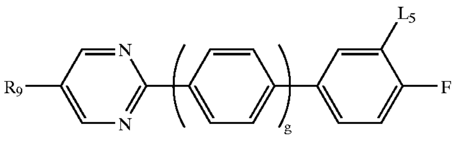

wherein, each of $R_7$ and $R_9$ is independently an alkyl group having 1 to 10 carbon atoms in which optional, non-adjacent methylene groups may be substituted by —O— or —CH═CH—, and in which optional hydrogen atoms may be substituted by fluorine atoms; $R_5$ is a —CN group or —C═C—CN; ring D is trans-1,4-cyclohexylene, 1,4-phenylene, 1,3-dioxane-2,5-diyl, or pyrimidine-2,5-diyl; ring E is trans-1,4-cyclohexylene, 1,4-phenylene in which hydrogen atoms may be substituted by fluorine atoms or pyrimidine-2,5-diyl; ring F is trans-1,4-cyclohexylene, or 1,4-phenylene; $Z_4$ is 1,2-ethylene, —COO—, or a single bond; each of $L_3$, $L_4$ and $L_5$ is independently a hydrogen atom or fluorine atom; and each of e, f, and g is independently 0 or 1;

(13)

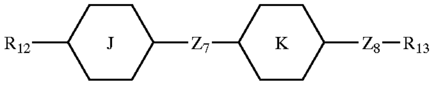

(14)

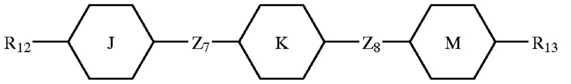

(15)

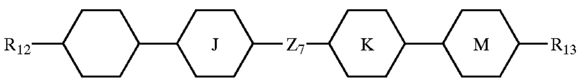

wherein, each of $R_{12}$ and $R_{13}$ is independently an alkyl group having 1 to 10 carbon atoms in which optional, non-adjacent methylene groups may be substituted by —O— or —CH═CH—, and in which optional hydrogen atoms may be substituted by fluorine atoms; each of rings J, K and M is independently trans-1,4-cyclohexylene, pyrimidine-2,5-diyl or 1,4-phenylene in which hydrogen atoms may be substituted by fluorine atoms; and each of $Z_7$ and $Z_8$ is independently 1,2-ethylene, —C≡C—, —COO—, —CH═CH—, or a single bond.

15. A liquid crystal display element according to claim 9, wherein the liquid crystal composition contains as the first component thereof at least one compound selected from those represented by general formulas (10), (11), and (12), and contains as the second component thereof at least one compound selected from those represented by general formulas (13), (14), and (15)

(10)

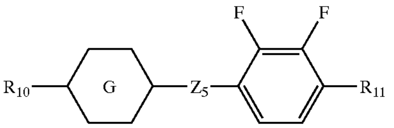

(11)

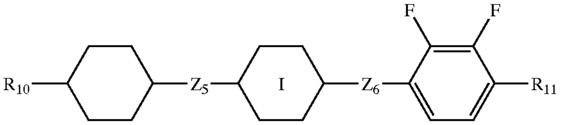

(12)

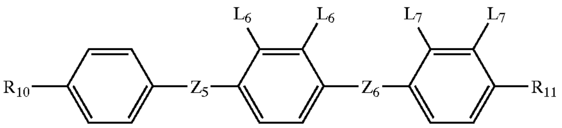

wherein, each of $R_{10}$ and $R_{11}$ is independently an alkyl group having 1 to 10 carbon atoms in which optional, non-adjacent methylene groups may be substituted by —O— or —CH═CH—, and in which optional hydrogen atoms may be substituted by fluorine atoms; each of rings G and I is independently trans-1,4-cyclohexylene or 1,4-phenylene; each of $L_6$ and $L_7$ is independently hydrogen atom or fluorine atom, but $L_6$ and $L_7$ are not hydrogen atoms simultaneously; and each of $Z_5$ and $Z_6$ is independently 1,2-ethylene, —COO—, or a single bond;

(13)

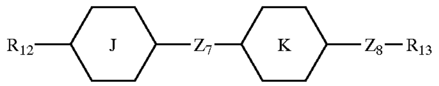

(14)

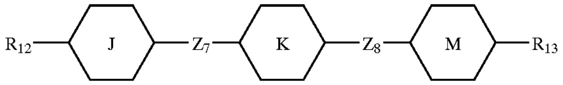

(15)

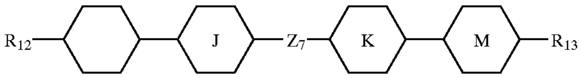

wherein, each of $R_{12}$ and $R_{13}$ is independently an alkyl group having 1 to 10 carbon atoms in which optional, non-adjacent methylene groups may be substituted by —O— or —CH═CH—, and in which optional hydrogen atoms may be substituted by fluorine atoms; each of rings J, K and M is independently trans-1,4-cyclohexylene, pyrimidine-2,5-diyl or 1,4-phenylene in which hydrogen atoms may be substituted by fluorine atoms; and each of $Z_7$ and $Z_8$ is independently 1,2-ethylene, —C≡C—, —COO—, —CH═CH—, or a single bond.

16. A liquid crystal display element according to claim 9, wherein the liquid crystal composition contains as the first component thereof at least one compound selected from those represented by general formulas (5), (6), and (7); contains as the second component thereof at least one compound selected from those represented by general formulas (8) and (9); and contains as the third component thereof at least one compound selected from those represented by general formulas (13), (14), and (15)

(5)

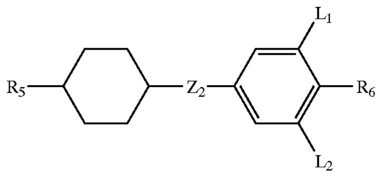

(6)

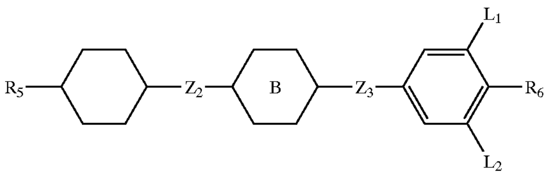

(7)

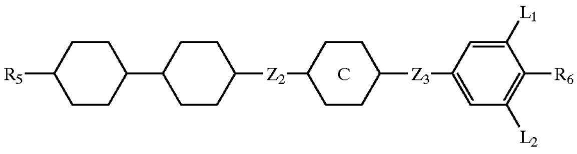

wherein, $R_5$ is an alkyl group having 1 to 10 carbon atoms in which optional, non-adjacent methylene groups may be substituted by —O— or —CH═CH—, and in which optional hydrogen atoms may be substituted by fluorine atoms; $R_6$ is fluorine atom, chlorine atom, —$OCF_3$, —$OCF_2H$, —$CF_3$, —$CF_2H$, —$CFH_2$, —$OCF_2CF_2H$ or —$OCF_2CFHCH_3$; each of $L_1$ and $L_2$ is independently a hydrogen atom or fluorine atom; each of $Z_2$ and $Z_3$ is independently 1,2-ethylene, 1,4-butylene, —COO—, —$CF_2O$—, —$OCF_2$—, —CH═CH—, or a single bond; ring B is trans-1,4-cyclohexylene, 1,3-dioxane-2,5-diyl, or 1,4-phenylene in which hydrogen atoms may be substituted by fluorine atoms; and ring C is trans-1,4-cyclohexylene, or 1,4-phenylene in which hydrogen atoms may be substituted by fluorine atoms;

(8)

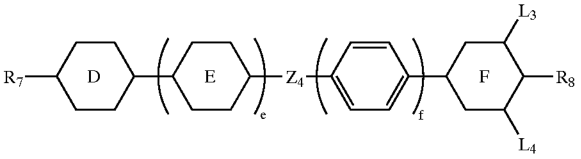

(9)

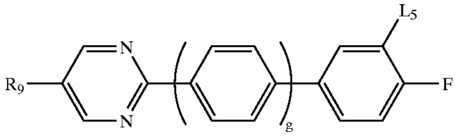

wherein, each of $R_7$ and $R_9$ is independently an alkyl group having 1 to 10 carbon atoms in which optional, non-adjacent methylene groups may be substituted by —O— or —CH═CH—, and in which optional hydrogen atoms may be substituted by fluorine atoms; $R_8$ is a —CN group or —C≡C—CN; ring D is trans-1,4-cyclohexylene, 1,4-phenylene, 1,3-dioxane-2,5-diyl, or pyrimidine-2,5-diyl; ring E is trans-1,4-cyclohexylene, 1,4-phenylene in which hydrogen atoms may be substituted by fluorine atoms or pyrimidine-2,5-diyl; ring F is trans-1,4-cyclohexylene, or 1,4-phenylene; $Z_4$ is 1,2-ethylene, —COO—, or a single bond; each of $L_3$, $L_4$ and $L_5$ is independently a hydrogen atom or fluorine atom; and each of e, f, and g is independently 0 or 1;

(13)

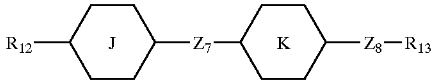

(14)

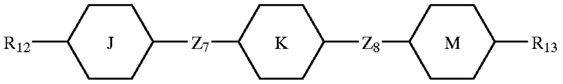

(15)

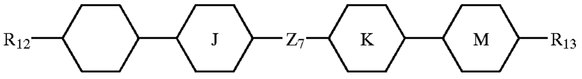

wherein, each of $R_{12}$ and $R_{13}$ is independently an alkyl group having 1 to 10 carbon atoms in which optional, non-adjacent methylene groups may be substituted by —O— or —CH═CH—, and in which optional hydrogen atoms may be substituted by fluorine atoms; each of rings J, K and M is independently trans-1,4-cyclohexylene, pyrimidine-2,5-diyl or 1,4-phenylene in which hydrogen atoms may be substituted by fluorine atoms; and each of $Z_7$ and $Z_8$ is independently 1,2-ethylene, —C≡C—, —COO—, —CH═CH—, or a single bond.

17. A liquid crystal display element according to claim 9, wherein the liquid crystal composition contains at least one compound selected from those represented by general formulas (8) and (9)

(8)

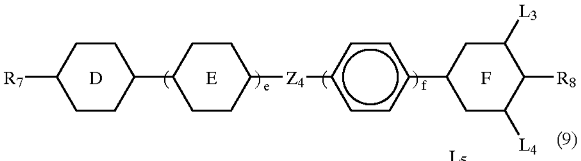

(9)

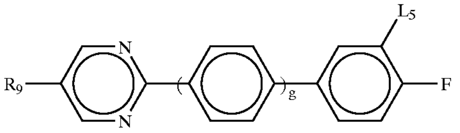

wherein, each of $R_7$ and $R_9$ is independently an alkyl group having 1 to 10 carbon atoms in which optional, nonadjacent methylene groups may be substituted by —O— or —CH═CH—, and in which optional hydrogen atoms may be substituted by fluorine atoms; $R_8$ is a —CN group or —C≡C—CN; ring D is trans-1,4-cyclohexylene, 1,4-phenylene, 1,3-dioxane-2,5-diyl, or pyrimidine-2,5-diyl; ring E is trans-1,4-cyclohexylene, 1,4-phenylene in which hydrogen atoms may be substituted by fluorine atoms, or pyrimidine-2,5-diyl; ring F is trans-1,4-cyclohexylene or 1,4-phenylene; $Z_4$ is 1,2-ethylene, —COO—, or a single bond; each of $L_3$, $L_4$, and $L_5$ is independently hydrogen atom or fluorine atom; and each of e, f, and g is independently 0 or 1.

* * * * *